United States Patent
Johnson et al.

(10) Patent No.: US 9,922,327 B2
(45) Date of Patent: Mar. 20, 2018

(54) SYSTEM, METHOD, AND COMPUTER PROGRAM FOR PROVIDING A MULTI-MERCHANT ELECTRONIC SHOPPING CART FOR A SHOPPING SERVICE

(71) Applicant: Ebates Inc., San Francisco, CA (US)

(72) Inventors: Kevin H. Johnson, Kentfield, CA (US); Tanuj Chatterjee, Burlingame, CA (US)

(73) Assignee: Ebates Inc., San Francisco, CA (US)

( * ) Notice: Subject to any disclaimer, the term of this patent is extended or adjusted under 35 U.S.C. 154(b) by 0 days.

(21) Appl. No.: 13/666,134

(22) Filed: Nov. 1, 2012

(65) Prior Publication Data
US 2014/0122203 A1 May 1, 2014

(51) Int. Cl.
*G06Q 30/06* (2012.01)
*G06Q 30/00* (2012.01)
(Continued)

(52) U.S. Cl.
CPC ............ *G06Q 30/00* (2013.01); *G06Q 20/12* (2013.01); *G06Q 30/02* (2013.01); *G06Q 30/06* (2013.01);
(Continued)

(58) Field of Classification Search
None
See application file for complete search history.

(56) References Cited

U.S. PATENT DOCUMENTS

| 4,910,672 A | 3/1990 | Off et al. |
| 5,250,789 A | 10/1993 | Johnsen |

(Continued)

FOREIGN PATENT DOCUMENTS

| CN | 101194282 | 6/2008 |
| JP | 10-240823 | 9/1998 |

(Continued)

OTHER PUBLICATIONS

Amazon, "Creating a Wish List", available Feb. 25, 2011, retrieved May 29, 2014, referred to hereinafter as Amazon. http://www.amazon.com/gp/help/customer/display.html?ie=UTF8&nodeId=501088.*

(Continued)

*Primary Examiner* — Rutao Wu
*Assistant Examiner* — Alfred H Tsui
(74) *Attorney, Agent, or Firm* — Lessani Law Group, PC

(57) ABSTRACT

A system, method, and computer program are provided for providing a multi-merchant electronic shopping cart within a web browser. The shopping cart can be used at a plurality of unrelated merchant shopping sites and remains within the browser regardless of the displayed website. When a user selects the shopping cart, a user interface is displayed with information about a product on the website without navigating to a new webpage. If the product has options, the user is able to select for the options via the user interface. The user is also able to save products from a plurality of shopping sites to the shopping cart or purchase products from the shopping cart at one time. For each product to be purchased, a purchase transaction is conducted, on behalf of the user, with the merchant associated with the website from which the user added the product to the shopping cart.

31 Claims, 25 Drawing Sheets

(51) Int. Cl.
*G06Q 30/02* (2012.01)
*G06Q 20/12* (2012.01)

(52) U.S. Cl.
CPC ..... *G06Q 30/0641* (2013.01); *G06Q 30/0643* (2013.01)

(56) References Cited

U.S. PATENT DOCUMENTS

| | | | |
|---|---|---|---|
| 5,500,890 | A | 3/1996 | Rogge et al. |
| 6,029,141 | A | 2/2000 | Bezos et al. |
| 6,128,600 | A | 10/2000 | Imamura et al. |
| 6,341,353 | B1 | 1/2002 | Herman et al. |
| 6,571,279 | B1 | 5/2003 | Herz et al. |
| 6,611,814 | B1 | 8/2003 | Lee et al. |
| 6,725,222 | B1 | 4/2004 | Musgrove et al. |
| 7,162,443 | B2 * | 1/2007 | Shah .......... 705/26.35 |
| 7,305,355 | B2 | 12/2007 | Tarvydas et al. |
| 7,328,176 | B2 | 2/2008 | Tarvydas et al. |
| 7,512,548 | B1 | 3/2009 | Bezos et al. |
| 7,734,729 | B2 | 6/2010 | Du et al. |
| 7,752,535 | B2 | 7/2010 | Satyavolu |
| 7,925,546 | B2 | 4/2011 | Jacobi et al. |
| 8,036,934 | B2 | 10/2011 | Mankoff |
| 8,392,288 | B1 | 3/2013 | Miller |
| 8,489,456 | B2 | 7/2013 | Burgess et al. |
| 8,510,166 | B2 | 8/2013 | Neven |
| 8,676,665 | B2 * | 3/2014 | Tarvydas et al. .......... 705/26.41 |
| 8,812,532 | B2 | 8/2014 | Skaf |
| 8,844,010 | B2 | 9/2014 | Brady et al. |
| 9,159,079 | B2 | 10/2015 | Lambert et al. |
| 9,201,672 | B1 | 12/2015 | Arana et al. |
| 2001/0032128 | A1 | 10/2001 | Kepecs |
| 2002/0038255 | A1 * | 3/2002 | Tarvydas et al. ........... 705/26 |
| 2002/0046109 | A1 | 4/2002 | Leonard et al. |
| 2002/0095335 | A1 | 7/2002 | Barnett et al. |
| 2002/0117544 | A1 | 8/2002 | Wolf et al. |
| 2002/0124255 | A1 * | 9/2002 | Reichardt .......... G06Q 30/0241 725/42 |
| 2002/0143660 | A1 | 10/2002 | Himmel et al. |
| 2003/0158844 | A1 | 8/2003 | Kramer et al. |
| 2004/0083134 | A1 | 4/2004 | Spero et al. |
| 2005/0131768 | A1 | 6/2005 | Rodriguez et al. |
| 2005/0267809 | A1 | 12/2005 | Zheng |
| 2006/0122899 | A1 | 6/2006 | Lee et al. |
| 2006/0242011 | A1 | 10/2006 | Bell et al. |
| 2006/0265281 | A1 | 11/2006 | Sprovieri et al. |
| 2007/0050258 | A1 | 3/2007 | Dohse |
| 2007/0271147 | A1 | 11/2007 | Crespo et al. |
| 2008/0103887 | A1 | 5/2008 | Oldham et al. |
| 2008/0154731 | A1 | 6/2008 | Mesaros |
| 2008/0155547 | A1 | 6/2008 | Weber et al. |
| 2008/0208606 | A1 | 8/2008 | Allsop et al. |
| 2008/0319854 | A1 * | 12/2008 | Duroux et al. ................. 705/14 |
| 2009/0024464 | A1 | 1/2009 | Weiss et al. |
| 2009/0083164 | A1 * | 3/2009 | Hull .................. G06F 17/30902 705/26.1 |
| 2009/0234737 | A1 | 9/2009 | Sarelson et al. |
| 2009/0240588 | A1 | 9/2009 | Turner |
| 2010/0042515 | A1 | 2/2010 | Crespo et al. |
| 2010/0174623 | A1 | 7/2010 | McPhie et al. |
| 2010/0205068 | A1 | 8/2010 | Hodson et al. |
| 2011/0106605 | A1 * | 5/2011 | Malik et al. ............... 705/14.23 |
| 2011/0167456 | A1 | 7/2011 | Kokenos et al. |
| 2011/0173097 | A1 | 7/2011 | McKee |
| 2011/0191181 | A1 | 8/2011 | Blackhurst et al. |
| 2012/0078731 | A1 | 3/2012 | Linevsky et al. |
| 2012/0166268 | A1 | 6/2012 | Griffiths |
| 2012/0197700 | A1 | 8/2012 | Kalin |
| 2012/0197753 | A1 | 8/2012 | Kalin |
| 2012/0203632 | A1 | 8/2012 | Blum et al. |
| 2013/0006803 | A1 | 1/2013 | Oskolkov et al. |
| 2013/0024282 | A1 | 1/2013 | Kansal et al. |
| 2013/0030853 | A1 | 1/2013 | Agarwal et al. |
| 2013/0046621 | A1 | 2/2013 | Asseoff et al. |
| 2013/0073356 | A1 | 3/2013 | Cooper et al. |
| 2013/0173364 | A1 | 7/2013 | Choong et al. |
| 2013/0179303 | A1 | 7/2013 | Petrou et al. |
| 2013/0185125 | A1 | 7/2013 | Celorio-Martinez et al. |
| 2013/0204748 | A1 | 8/2013 | Sugiura |
| 2013/0246199 | A1 | 9/2013 | Carlson |
| 2013/0346221 | A1 | 12/2013 | Rangachari et al. |
| 2014/0100929 | A1 | 4/2014 | Burgess et al. |
| 2014/0200997 | A1 | 7/2014 | Anderson et al. |

FOREIGN PATENT DOCUMENTS

| | | |
|---|---|---|
| JP | 11-134408 | 5/1999 |
| JP | 2000-163480 | 6/2000 |
| JP | 2001-109742 | 4/2001 |
| JP | 2002-063431 | 2/2002 |
| JP | 2002-245366 | 8/2002 |
| JP | 2002-259792 | 9/2002 |
| JP | 2002-312608 | 10/2002 |
| JP | 2012-093953 | 5/2012 |
| KR | 10-2009-0008777 | 1/2009 |
| KR | 10-2010-0099843 | 9/2010 |
| KR | 10-2011-0055182 | 5/2011 |
| KR | 10-2011-0120241 | 11/2011 |
| RU | 2428741 | 9/2011 |
| WO | 2012074919 | 6/2012 |
| WO | 2012103462 | 8/2012 |
| WO | 2012165033 | 12/2012 |

OTHER PUBLICATIONS

International Search Report and Written Opinion in corresponding PCT Application No. PCT/US2013/066691 dated Mar. 14, 2014.
International Preliminary Report on Patentability in PCT Application No. PCT/US2013/066691 dated Feb. 12, 2015.
Bajaj, "Shopping for Diwali? Here's how you can crack the best online deals", Oct. 20, 2016, pp. 1-3.
Impulse, "Save your favorite products on an impulse. Buy them when you're ready", retrieved Oct. 23, 2016, pp. 1-2.
Keepa, "Features", retrieved Oct. 23, 2016, p. 1-1.
Owen et al., "Going Beyond Redemption: Closing the Loop with Card-Linked Offers", Jul. 12, 2012, pp. 1-8.
Shoptagr, "When you discover something you want, save it to Shoptagr", retrieved Oct. 23, 2016, p. 1-1.
Taggr, "Wish List any Store & Price Watch", retrieved Oct. 23, 2016, p. 1-1.
Ziftr Alerts, "You do the shopping. Well do the searching. It's that simple", retrieved Oct. 23, 2016, pp. 1-2.
Wishlist, "Extension for Wishlist App", retrieved Oct. 23, 2016, p. 1-1.
Wishtack, "Gift Ideas & Wishlist", retrieved Oct. 23, 2016, p. 1-1.
Word Press, "Status Tracking", retrieved Oct. 25, 2016, pp. 1-4.

* cited by examiner

```
Providing a shopping cart object within a user's browser that provides access to an
electronic shopping cart that can be used at a plurality of unrelated merchant shopping
sites. The shopping cart object remains within the browser regardless of the website
                        displayed within the browser.
                                     110
                                      │
                                      ▼
In response to the user selecting a visual representation of the shopping cart object
(e.g., an icon in a toolbar), generating a user interface for an electronic shopping cart.
                                     120
                                      │
                                      ▼
                        ╱Is the webpage╲
                       ╱ displayed within ╲         Display message in user
                      ╱  the browser supported ╲──No──▶ interface indicating that
                      ╲    by the electronic    ╱       webpage viewed by
                       ╲    shopping cart?     ╱        user is unsupported.
                        ╲                    ╱                 130
                                 │
                                Yes
                                 ▼
   Obtain information related to a product displayed on the webpage. Information may
                    include price and any available product options.
                                     140
                                      │
                                      ▼
       Display product information within the user interface for the electronic shopping cart.
                                     150
                                      │
                                      ▼
Enable the user to either buy the product or save the product to the electronic shopping
cart for later retrieval. Products from a plurality of different merchants can be saved to
                          the electronic shopping cart.
                                     160
```

User elects to buy product         User elects to save product ( A )    FIG. 1a    ( B )

SYSTEM, METHOD, AND COMPUTER PROGRAM FOR PROVIDING A MULTI-MERCHANT ELECTRONIC SHOPPING CART FOR A SHOPPING SERVICE

BACKGROUND OF THE INVENTION

1. Field of the Invention

This invention relates generally to an electronic commerce shopping service system and, more particularly, to a system and method for providing a multi-merchant electronic shopping cart for a shopping service.

2. Description of the Background Art

It is often desirable for a consumer to be able to purchase a product via an electronic commerce shopping service. By using an electronic commerce shopping service, not only is the consumer able to "visit" multiple unrelated merchant shopping sites without the time and expense of commuting, but also the shopping service is able to recommend merchant shopping sites to the consumer thus increasing consumer confidence and to provide a global reward system that can encompass many merchant shopping sites. Currently, in order for a consumer to use a shopping service, he or she must initiate the purchase process though a specific shopping service website. It would be desirable to have an electronic shopping cart for a shopping service that can be used at multiple merchant shopping sites and can be easily accessed while browsing the merchant website without having to navigate to another website. It would also be desirable to be able to save multiple products from various merchants to the electronic shopping cart and be able to purchase all of the products at one time.

SUMMARY OF THE INVENTION

The present invention is directed to a system, method, and computer program for providing a multi-merchant electronic shopping cart (i.e., a shopping cart object in the form of a bookmarklet, browser add-on, browser extension, browser widget, or toolbar) within a web browser for a shopping service. The shopping cart can be used at a plurality of unrelated merchant shopping sites and remains within the browser regardless of the website displayed in the browser. In response to a user selecting a visual representation of the shopping cart from within the browser, a user interface is displayed for the electronic shopping cart in a new window. A user is able to view the user interface for the electronic shopping cart without navigating the browser to a new webpage.

In response to the user selecting the visual representation while a webpage supported by the electronic shopping cart is displayed in the browser, information related to a product on the supported webpage is displayed in the user interface. In certain cases, displaying information may include extracting product information from the webpage, normalizing the extracted information, and displaying the normalized information in the user interface. In other cases, displaying information may include identifying an application programming interface (API) associated with the website, sending a request for product information on the webpage to the API, receiving the requested information, and displaying the requested information in the user interface for the electronic shopping cart. If the product has one or more options, the information includes the options and the user is able to enter selections for the options via the user interface.

The user is able to either commence a purchase transaction for one or more products via the electronic shopping cart or save products from a plurality of unrelated merchant shopping sites to the electronic shopping cart for retrieval at a later time. In certain cases, conducting a purchase transaction may include retrieving a user-saved address and payment information, providing the information to the merchant associated with the purchase transaction, receiving a purchase confirmation from the merchant, and communicating the purchase confirmation to the user.

The user may elect to purchase at one time a single product, multiple products from a single merchant shopping site, or multiple products from multiple unrelated merchants shopping sites that are saved to the electronic shopping cart. For each product to be purchased, a purchase transaction is conducted, on behalf of the user, with the merchant associated with the supported website from which the user added the product to the electronic shopping cart.

In certain cases, the electronic shopping cart is associated with a shopping service that provides a reward based on purchases through the shopping service. For example, the reward may include a cash back percentage, points, frequent flier miles, etc. In certain embodiments, a coupon may be applied in a purchase transaction to a product or to a corresponding merchant.

BRIEF DESCRIPTION OF THE DRAWINGS

FIGS. 1a-1b are a flowchart that illustrates a general method for providing a multi-merchant electronic shopping cart for a shopping service.

DETAILED DESCRIPTION OF THE PREFERRED EMBODIMENTS

Figure 1B:
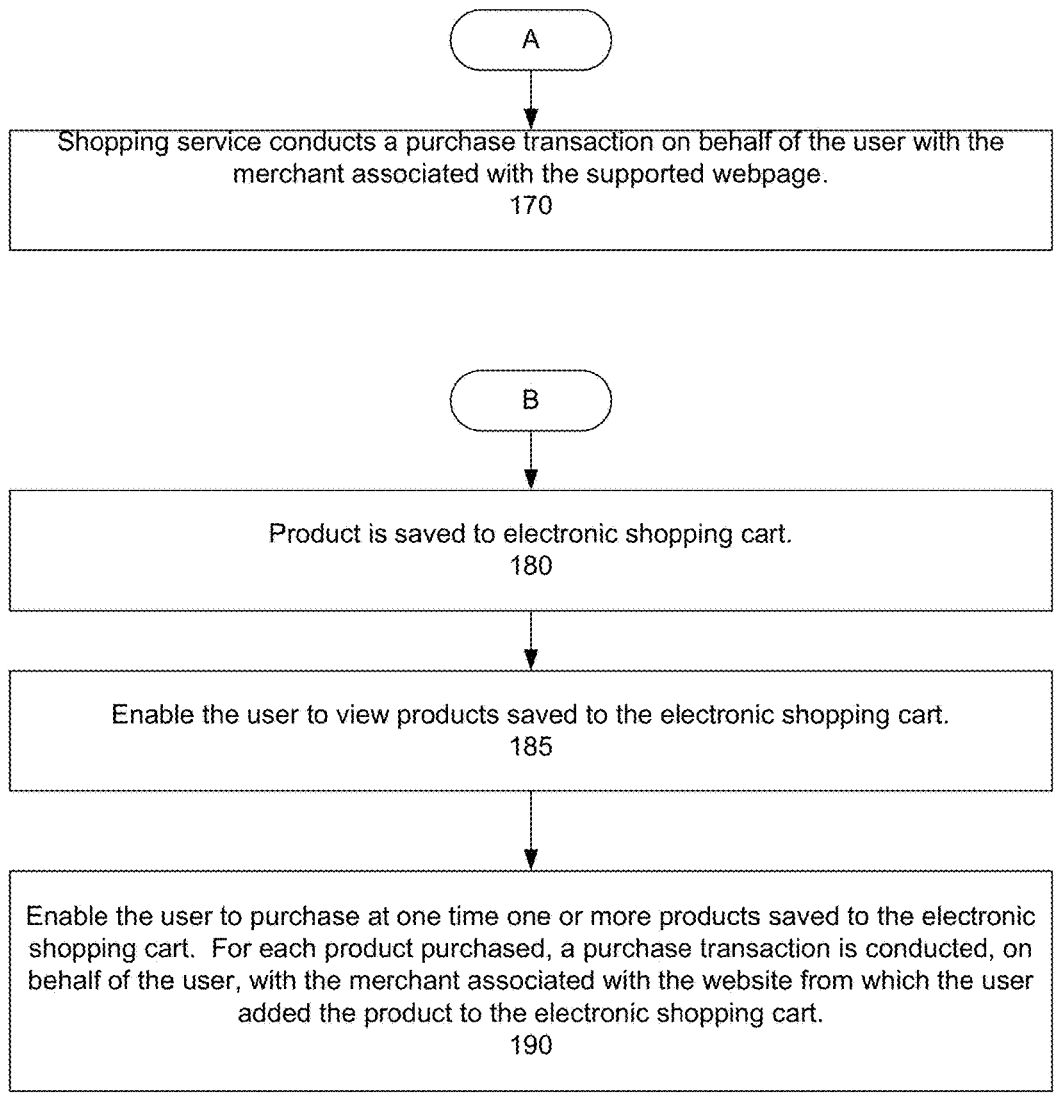

The present invention provides a system, method, and computer program for providing a multi-merchant electronic shopping cart for a shopping service. In the preferred embodiment as seen in FIGS. 1a-1b, a shopping cart object is provided within a user's browser that provides access to an electronic shopping cart that can be used at a plurality of unrelated merchant shopping sites (step 110). The shopping cart object is a software program embedded within the browser. Examples of shopping cart objects include, but are not limited to, a bookmarklet, a browser add-on, a browser extension, a browser widget, or a toolbar. The shopping cart object may provide access to a single electronic shopping cart or to a plurality of electronic shopping carts, where the user is able to save products (e.g., goods or services) to any one of a plurality of electronic shopping carts. In certain embodiments, at least one of a plurality of electronic shopping carts represents a registry. The electronic shopping carts may be public or private and the user may be able to designate a privacy level for each of the electronic shopping carts. The shopping cart object remains within the browser regardless of the website displayed within the browser.

In response to the user selecting a visual representation of the shopping cart object (e.g., an icon in a toolbar), a user interface is generated for the electronic shopping cart (step 120). The user interface for the electronic shopping cart may be displayed in a new window (i.e., a window, popup, or overlay), where the user is able to view the user interface without navigating the browser to a new webpage.

A supported webpage is a webpage from which a user is able to view and purchase products via the electronic shopping cart. If the webpage displayed within the browser is not supported by the shopping cart object, a message is displayed in the user interface indicating that the webpage viewed by the user is unsupported (step 130). But if the webpage is supported, then information is obtained related to a product displayed on the webpage for display on the user interface (step 140). If there is more than one product on the webpage, the user may be requested to select a particular product. The product information is displayed within the user interface for the electronic shopping cart and may include, for example, the image of the product, product price, tax (if known), shipping (if known, or based on a default shipping method), total price, and any available product options (e.g., size, color, quantity, etc.) (step 150). The user is able to enter selections for the options via the user interface.

The user is able to either buy the product or save the product to the electronic shopping cart for later retrieval (step 160). Products from a plurality of different merchants can be saved to the electronic shopping cart. If the user elects to buy the product, the shopping service conducts a purchase transaction on behalf of the user with the merchant associated with the supported webpage (step 170). In conducting the purchase transaction, the user may be prompted for the shipping method, address, payment information, or such information may be retrieved from the user's profile. Once the shipping method and address are obtained, the price information is updated with shipping costs and tax, if applicable.

If the user elects to save the product, then the product is saved to the electronic shopping cart (step 180). The user is able to view the products saved to the electronic shopping cart via, for example, a button or link on the user interface (step 185). Alternately, the user can view the saved contents of the shopping cart from a separate website. The user is also able to purchase at one time, from a plurality of unrelated merchant sites, one or more products saved to the electronic shopping cart (step 190). For each product purchased, a purchase transaction is conducted on behalf of the user, with each merchant associated with the website from which the user added a product to the electronic shopping cart. In one embodiment, a user can purchase multiple products from multiple merchants with a single action (e.g., clicking a button).

In certain embodiments, the electronic shopping cart is associated with a shopping service that provides a reward based on purchases through the shopping service such that purchases made through the electronic shopping cart are credited towards the reward calculation. The information displayed in the user interface may include the rewards calculation. The reward may be in the form of a cash back percentage for each product purchased, points, frequent flier miles, etc. Different rewards map apply to different merchants and there may be separate rules for calculating rewards for each merchant. In certain embodiments, the electronic shopping cart alerts the user when a reward is available by, for example, changing the shopping cart icon color or flashing the shopping cart icon. The user may be required to take an action to apply the reward (e.g., click a button) or the reward may be applied automatically. In the case where the shopping service provides a cash back reward for purchases, the cash back amount is determined for each product displayed in the user interface for the electronic shopping cart. The cash back amount is then displayed in the user interface for the electronic shopping cart. In response to a user purchasing a product via the electronic shopping cart, the user is credited with the cash back amount.

In certain embodiments, the multi-merchant electronic shopping cart automatically checks for coupons. For each product displayed in the user interface, the electronic shopping cart determines if any coupon applies to the product or the corresponding merchant. For example, the electronic shopping cart may check for any coupons for a particular store, then check whether any of those coupons are applicable to the product based on the product's description, validity period of the coupon, and terms of the coupon, etc. In response to identifying one or more coupons applicable to the product, the coupon information is displayed in the user interface. In response to the user purchasing the product, any identified coupons are applied to the purchase. Determining if the coupon applies may include identifying any potentially-applicable coupons and for each potentially-applicable coupon, initiating an online purchase transaction with the applicable merchant to identify any price savings related to the coupon, where the purchase transaction is terminated before completion of a purchase. In certain embodiments, determining if a coupon applies includes identifying any potentially-applicable coupons and sending an application programming interface (API) request to the merchant to determine whether any potentially-applicable coupons may be used in the purchase transaction.

In certain embodiments, displaying the information in the user interface includes extracting the product information from the webpage, normalizing the extracted information, and displaying the normalized information in the user interface. In other embodiments, displaying the information in the user interface includes identifying an API associated with the website, sending a request for product information on the webpage to the API, receiving the requested information, and displaying the request information in the user interface for the electronic shopping cart.

Figure 2A:
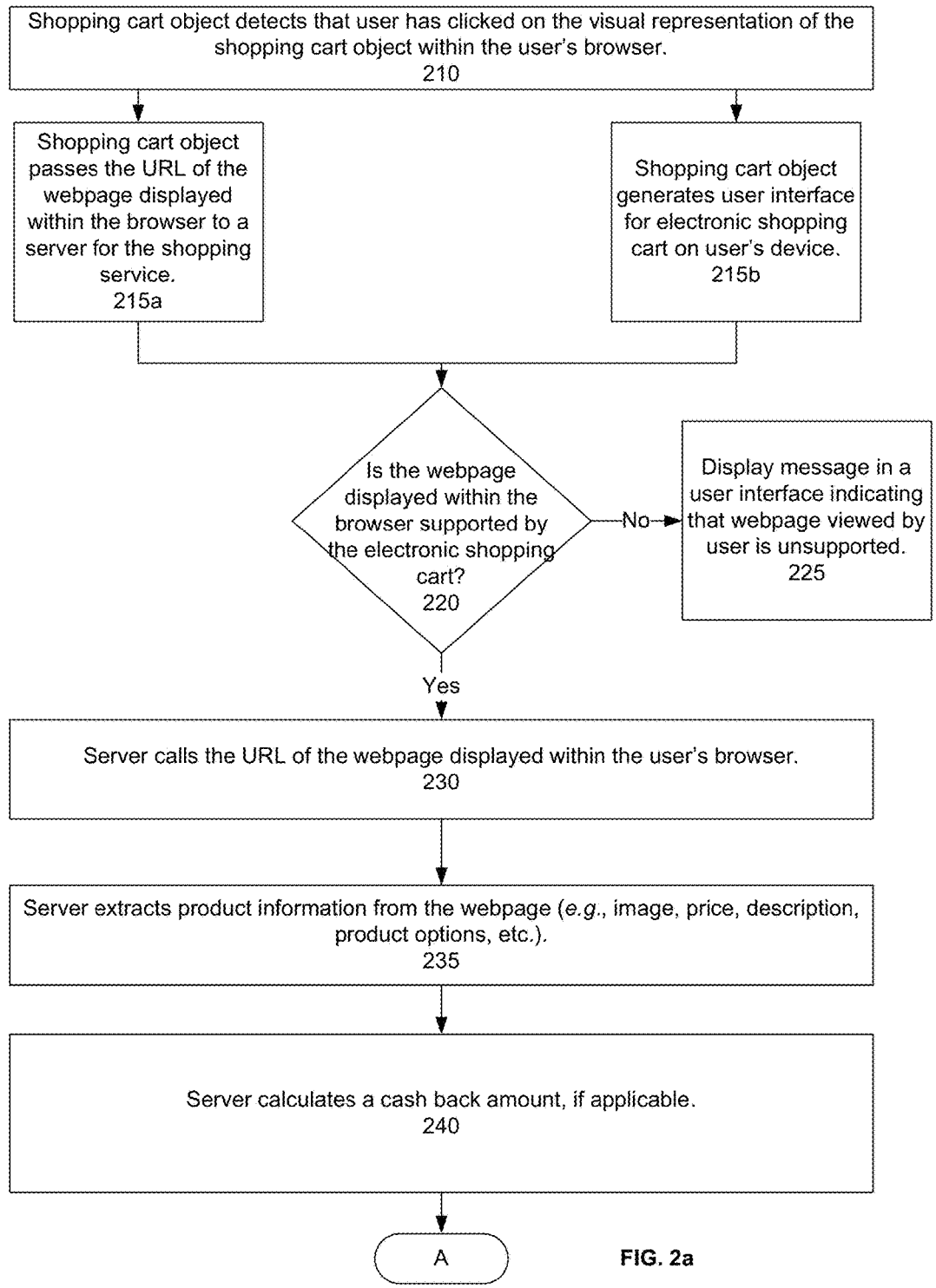
FIGS. 2a-2b are a flowchart that illustrates an example implementation for providing a multi-merchant electronic shopping cart for a shopping service according to one embodiment of the invention.
Figure 2B:
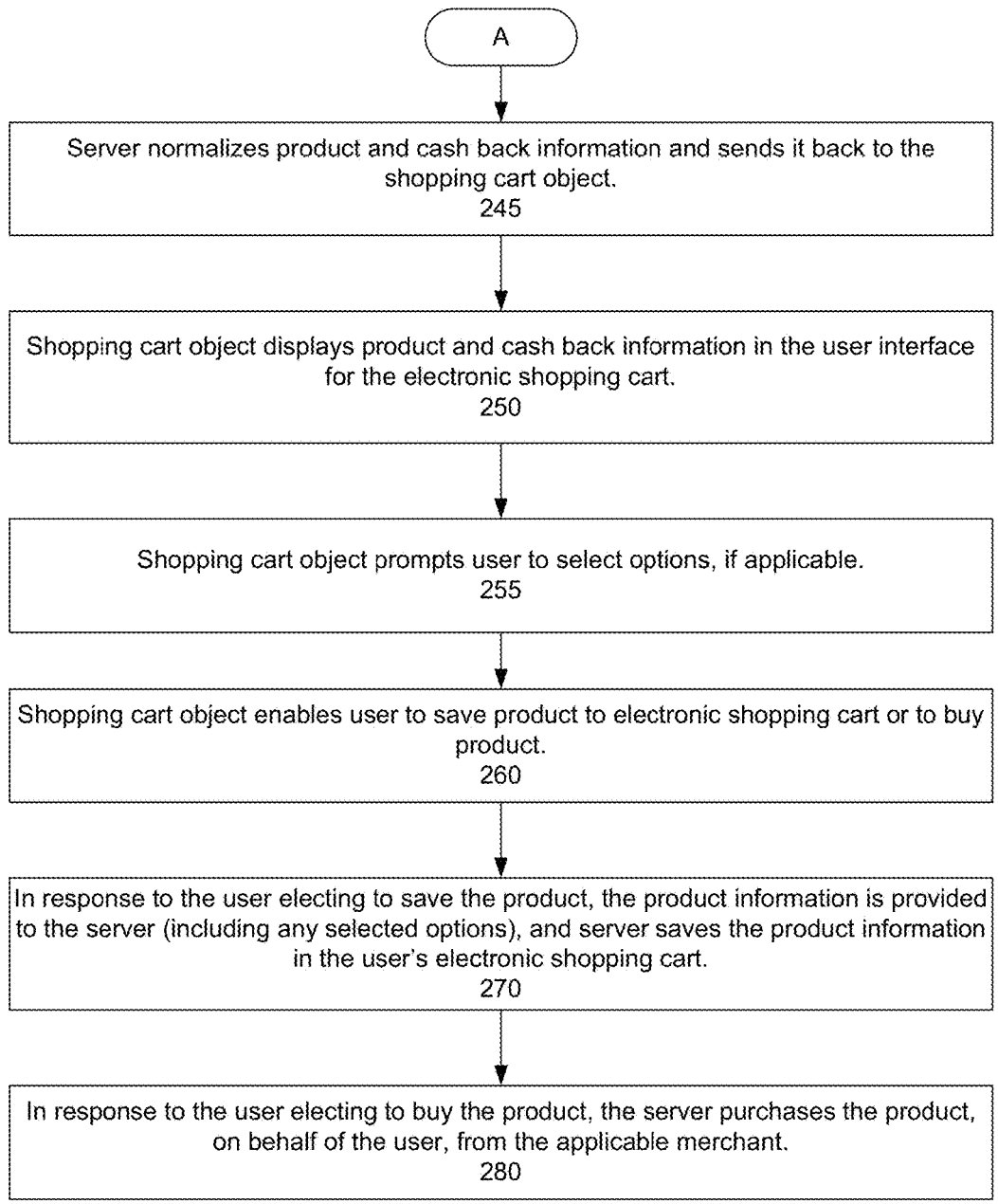

FIGS. 2a-2b illustrate an example implementation of one method for providing a multi-merchant electronic shopping cart for a shopping service according to one embodiment. In this example, the shopping cart object is a bookmarklet, which detects that the user has clicked on its visual representation within the browser (step 210). The shopping cart object passes the URL of the webpage displayed within the browser to a server for the shopping service (step 215a). The shopping cart object generates a user interface for the electronic shopping cart on the user's device (step 215b).

The server then determines whether the webpage displayed within the browser is supported by the shopping cart object (step 220). If it is not, then a message is displayed in the user interface indicating that the webpage viewed by the user is unsupported (step 225). If, however, the webpage is supported, then the server calls the URL of the webpage displayed within the user's browser (step 230). The server then extracts product information from the webpage (e.g., image, price, description, product options, etc.) (step 235). In an alternate embodiment aimed at optimizing performance, the shopping cart object may extract (e.g., "scrape") some or all of the product information from the webpage. For example, the shopping cart object may extract the image, price, and title of the product from the merchant shopping site. The remainder of the information, such as, for example, any product options may be extracted by the back-end server. In another alternate embodiment, the server may send an API request to the merchant for the product information. For example, the server may send an ISBN number of a book to a merchant or a product database.

The server also calculates a cash back amount or other reward, if applicable (step 240). In certain cases, the cash back amount may be zero. The server then normalizes the product and cash back information and sends it back to the shopping cart object (step 245). The shopping cart object displays the product and cash back information in the user interface for the electronic shopping cart (step 250). The shopping cart object prompts the user to select options, if applicable (step 255). The shopping cart object enables the user to save the product to the electronic shopping cart or to buy the product (step 260).

In response to the user electing to save the product, the product information is provided to the server (including any selected options), and the server saves the product information in the user's electronic shopping cart (step 270). The electronic shopping cart may be manifested in the form of a database table or an entry in a database table, and the product information may be saved in the database table. Saved information includes the URL of the applicable webpage displaying the product. In response to the user electing to buy the product, the server purchases the product, on behalf of the user, from the applicable merchant (step 280).

Figure 3:
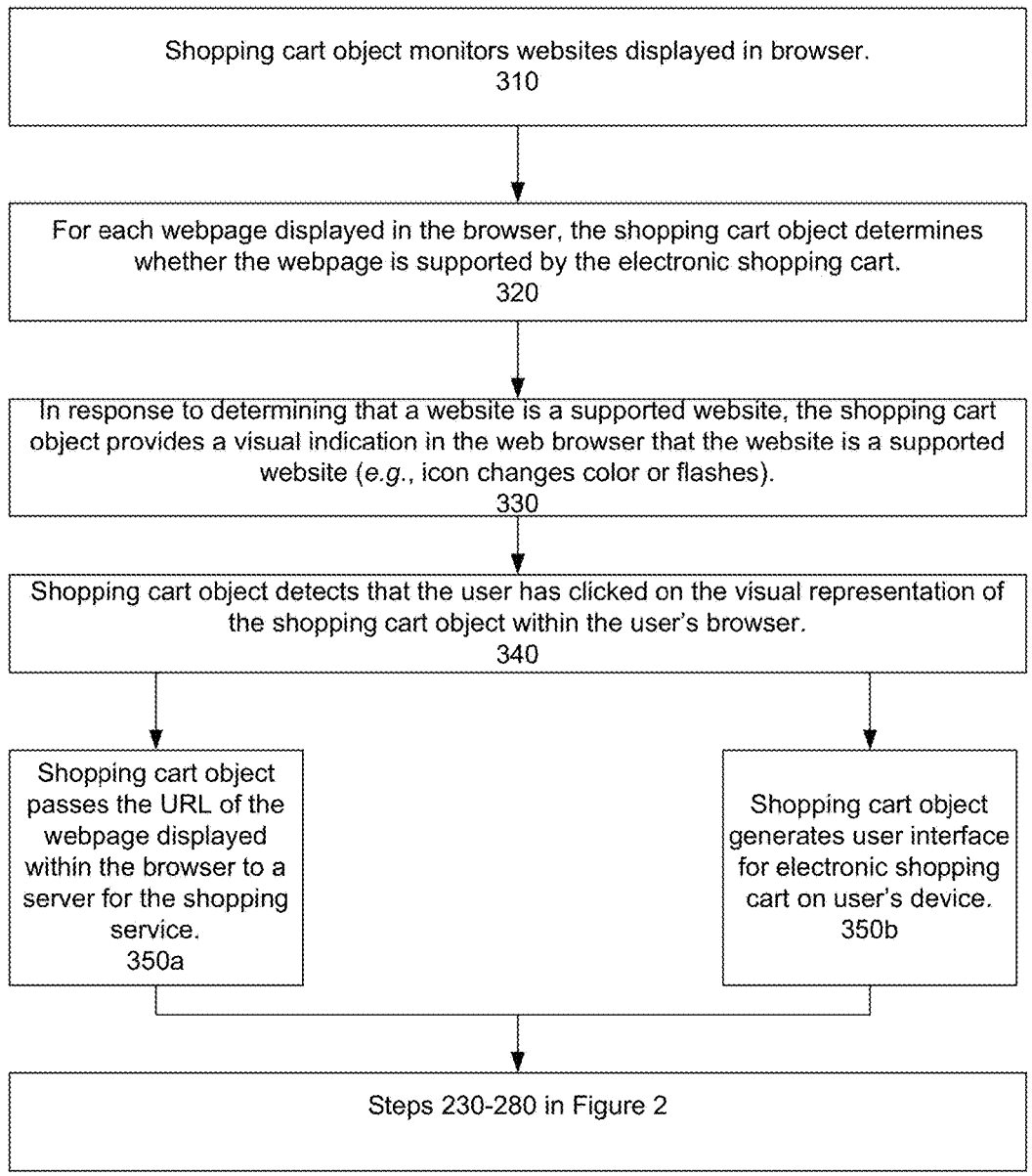
FIG. 3 is a flowchart that illustrates an alternate implementation for providing a multi-merchant electronic shopping cart for a shopping service according to one embodiment of the invention.

FIG. 3 illustrates another example implementation of one method for providing a multi-merchant electronic shopping cart for a shopping service according to one embodiment. In this example, the shopping cart object is a browser widget, which monitors websites displayed in the browser (step 310). For each webpage displayed in the browser, the shopping cart object determines whether or not the webpage is supported by the electronic shopping cart (step 320). The shopping cart object may check with a server for the shopping cart service to make this determination, and/or the shopping cart object may check a local list of supported webpages or domains previously downloaded to the shopping cart object. In response to determining that a website is a supported website, the shopping cart object provides a visual indication in the web browser that the website is a supported website (e.g., an icon changes color or flashes) (step 330). The shopping cart object detects that the user has clicked on the visual representation of the shopping cart object within the user's browser (step 340). The shopping cart object passes the URL of the webpage displayed within the browser to a server for the shopping service (step 350*a*). The shopping cart object also generates a user interface for the electronic shopping cart on the user's device (step 350*b*). Steps 230 to 280 of FIG. 2 are then repeated.

Figure 4:
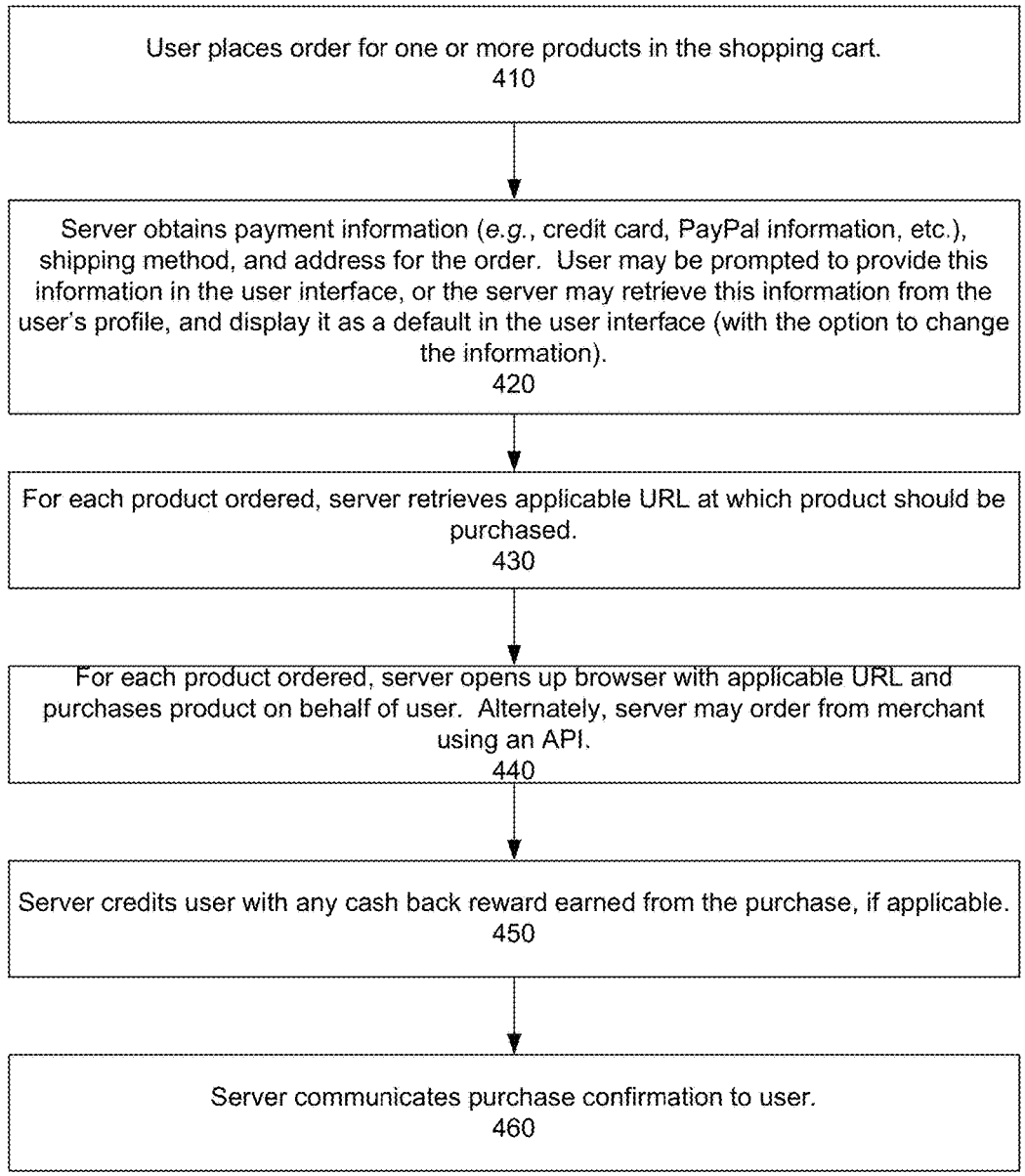
FIG. 4 is a flowchart that illustrates a method for conducting a purchase transaction according to one embodiment of the invention.

FIG. 4 illustrates a method for conducting a purchase transaction according to one embodiment of the invention. A user places an order for one or more products in the shopping cart (step 410). The server obtains payment information (e.g., credit card, PayPal information, etc.), shipping method, and address for the order (step 420). The user may be prompted to provide this information in the user interface, or the server may retrieve this information from the user's profile, and display it as a default in the user interface (with the option to change the information). In certain embodiments, the server may send to the user an acknowledgement of the purchase order with or without the purchase transaction details via the user interface, an email, a text message, and/or an audio message. For each product ordered, the server retrieves the applicable URL at which the product should be purchased (step 430). For each product ordered, the server opens up a browser with the applicable URL and purchases the product on behalf of the user by providing the user-saved address and payment information to each of the merchants associated with the purchase transaction in much the same way as the user would do (step 440). Alternatively, the server may order from each of the merchants using an API. Either way, in the preferred embodiment, the purchase transaction is between the user and the merchant (i.e., the server acts on behalf of the user). The server then credits the user with any cash back rewards earned from the purchase, if applicable (step 450). The server receives a purchase confirmation from each of the merchants and communicates the purchase confirmation to the user (step 460). The purchase confirmation may be communicated to the user immediately following the purchase order or at a later time when the purchase transaction has been completed. The purchase confirmation may be sent by means of displaying the confirmation in the user interface, sending an email to the user's email account, sending a text message to the user's mobile device, or sending an audio message to the user's telephone.

The methods described with respect to FIGS. 1*a*-4 are embodied in software and performed by a computer system (comprising one or more computing devices) executing the software. A person skilled in the art would understand that a computer system has a memory or other physical, computer-readable storage medium for storing software instructions and one or more processors for executing the software instructions.

Figure 5:
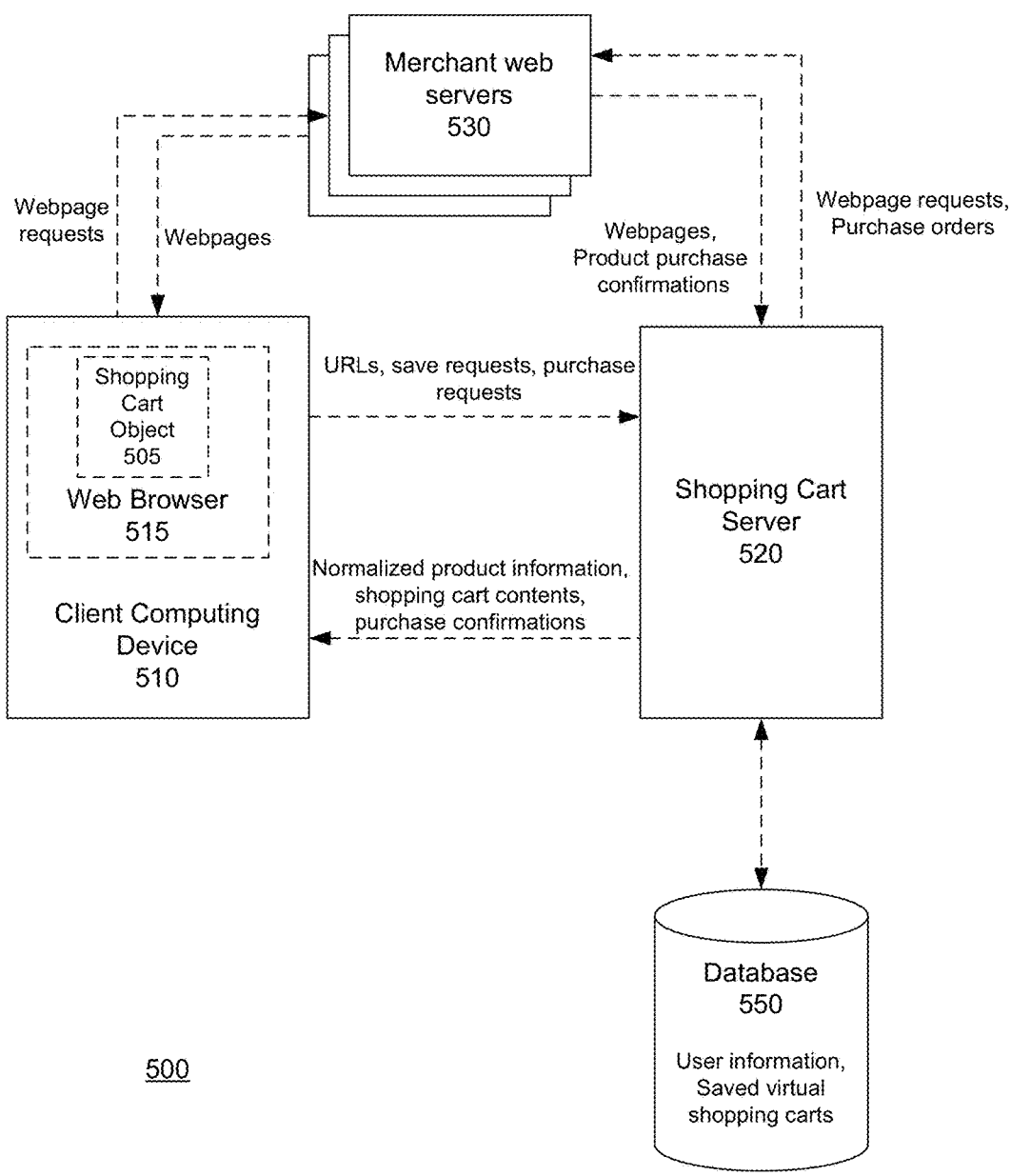
FIG. 5 is a block diagram of a multi-merchant electronic shopping cart system according to one embodiment of the invention.

FIG. 5 illustrates an exemplary multi-merchant electronic shopping cart system 500 according to one embodiment of the invention. As a person skilled in the art would understand, the multi-merchant electronic shopping cart system 500 may be constructed in any number of ways within the scope of the present invention. The methods of FIGS. 1*a*-4 may be implemented in other systems, and the invention is not limited to system 500.

The multi-merchant electronic shopping cart system 500 includes a shopping cart object 505 (e.g., a bookmarklet, a browser add-on, a browser extension, a browser widget, a toolbar, etc.) within a web browser 515 on a client computing device 510. Examples of client computing devices may include a desktop, a laptop, or a mobile device, etc. A user employs the web browser 515 to view products from one or more merchant shopping sites. The web browser 515 sends a request for a webpage associated with a merchant shopping site to a merchant web server 530 and receives back the webpage associated with the request.

The shopping cart object 505, which serves as a client software application in the shopping cart system 500, then sends the URL of the displayed webpage to the shopping cart server 520. The shopping cart server requests the webpage from the merchant web server 530 corresponding to the URL. The server extracts information about the product from the webpage (or sends an API request to the merchant web server for information about the product), which it then normalizes and returns to the shopping cart object 505 for display on a user interface window. Examples of information about the product include price, image, and any product options. In certain embodiments, the shopping cart object 505 may extract information from the webpage in lieu of, or in addition to, the shopping cart server 520 extracting information from the merchant web site or web server 530. In a preferred embodiment, the client device 510, shopping cart server 520, and merchant web server 530 communicate via the Internet.

In response to the user deciding to save a product from the user interface window to the shopping cart, the shopping cart object 505 sends the save request to the shopping cart server 520, which saves the virtual shopping carts in a database 550. The virtual shopping cart may contain products from multiple unrelated merchant sites. The user may, in certain embodiments, wish to view products saved in his or her shopping cart. In which case the shopping cart server 520 sends the shopping cart content information to the shopping cart object 505 for the user to view in the user interface window.

In response to the user deciding to purchase one or more products from the shopping cart, the shopping cart object 505 sends a purchase request to the shopping cart server 520. The purchase request may be for one product in the shopping cart, multiple products from a single merchant shopping site, or multiple products from multiple unrelated merchant shopping sites. As such, the shopping cart server completes the purchase order with each of the merchant shopping sites corresponding to each product on the purchase order, which may involve more than one merchant web server 530.

If the user previously purchased other products, the user may have stored user information (e.g., payment information, shipping method, and address) saved by the shopping cart server 520 in a database 550. The shopping cart server 520 may complete the purchase order with the merchant web servers 530 using the user information saved in the database 550. The merchant web servers 530 then process the purchase order and return product purchase confirmations to the shopping cart server 520, which then sends a purchase confirmation to the user. The purchase confirmation may be sent to the user immediately after the user submits his or her purchase request or at a later time. The purchase confirmation may be sent to the user via the web browser as a confirmation page, to the user's email address, as a text message to the user's mobile device, or as an audio recording to the user's phone.

FIGS. 6a-7e illustrate screenshots of an exemplary user interface according to the present invention. A person skilled in the art would understand that the present invention may be embodied on other user interfaces having more or less functionality within the scope of the present invention. As such, FIGS. 6a-7e are intended to be illustrative and not limiting in any way.

Figure 6A:
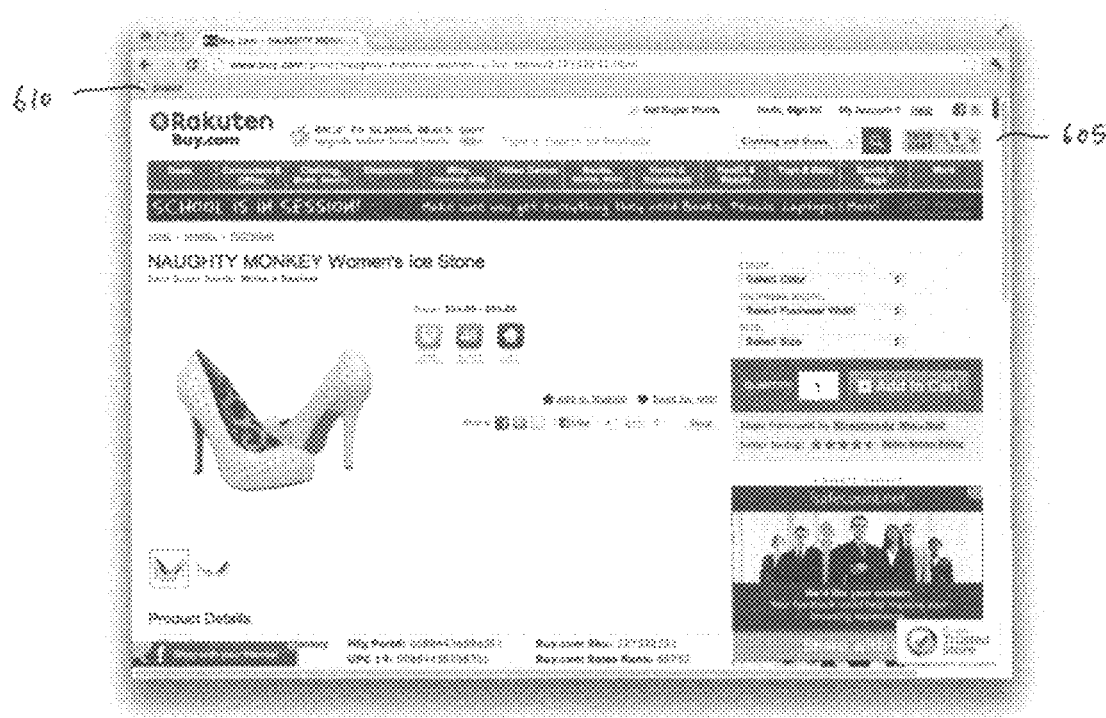
FIGS. 6a-6m are screenshots of an exemplary user interface in a multi-merchant electronic shopping cart system according to one embodiment of the invention.

FIGS. 6a-6m illustrate screenshots of a user interface tracking a user who is purchasing a product using the multi-merchant shopping cart. In FIG. 6a, the user views women's dress shoes on a merchant site. In contrast to shopping cart 605, which is linked to the particular merchant site, virtual shopping cart 610 is a shopping cart object that remains within the browser and provides shopping service for any number of unrelated merchant sites. In this particular example, the shopping cart 610 is a bookmarklet, but the shopping cart object may be designed as a browser add-on, browser extension, browser widget, toolbar, etc.

Figure 6B:
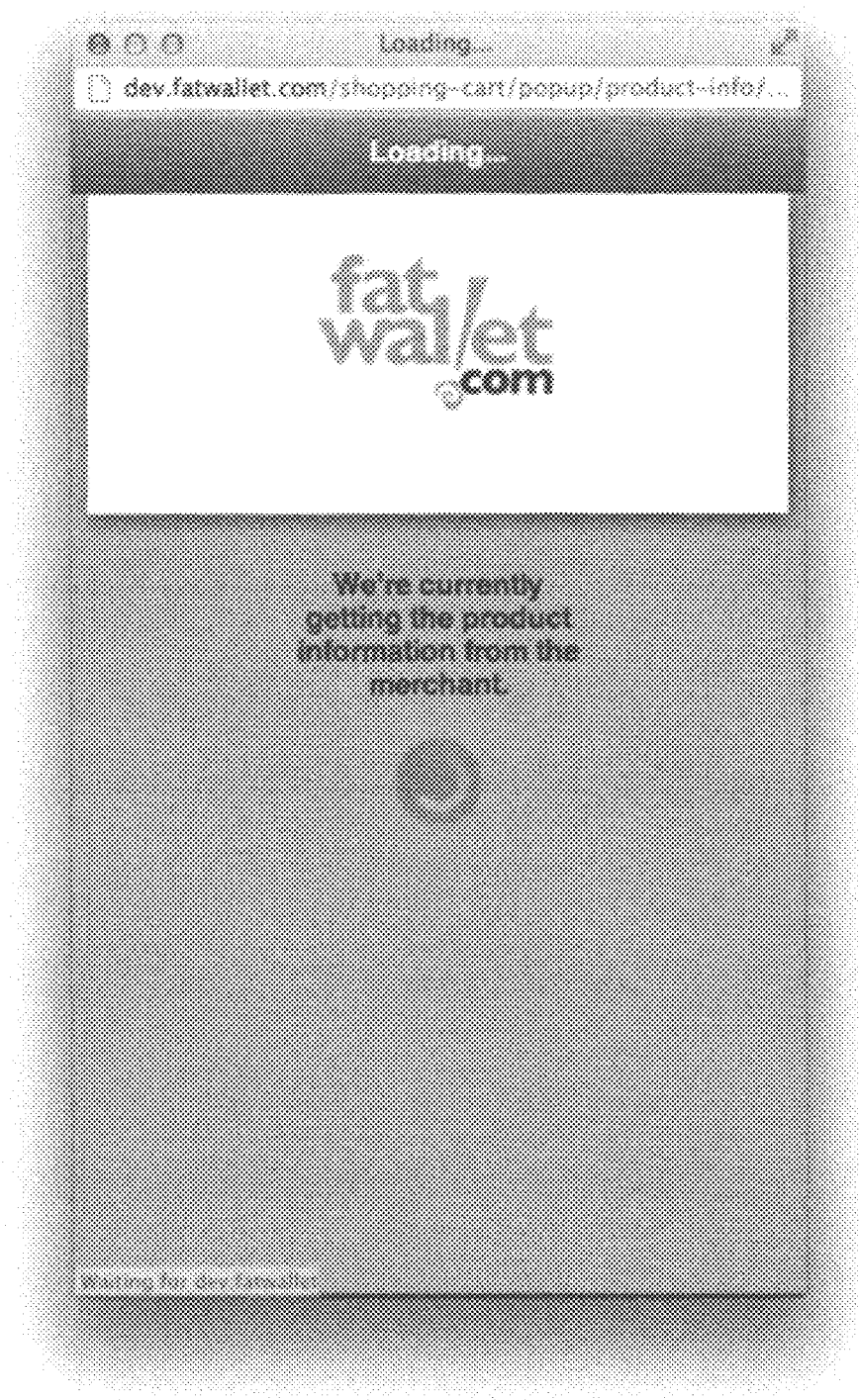
Figure 6C:
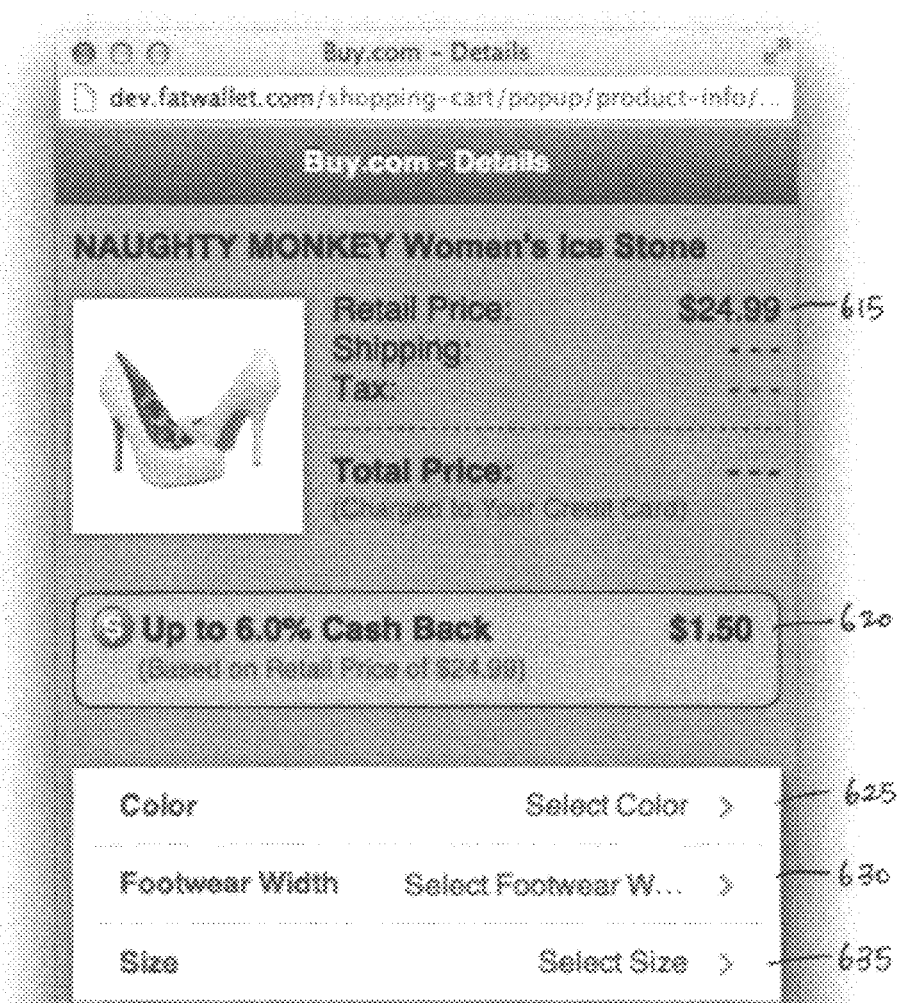

In FIG. 6b, the shopping cart 610 retrieves information about the product from the merchant website by sending the website's URL to the shopping cart server and receiving back normalized product information, as discussed more fully with regard to FIG. 5. As seen in FIG. 6c, the user interface displays information regarding the price 615 of the product and cash back information 620. Shipping and tax information are dependent on the elected shipping method and the user's shipping address and may be provided at a later time.

Figure 6D:
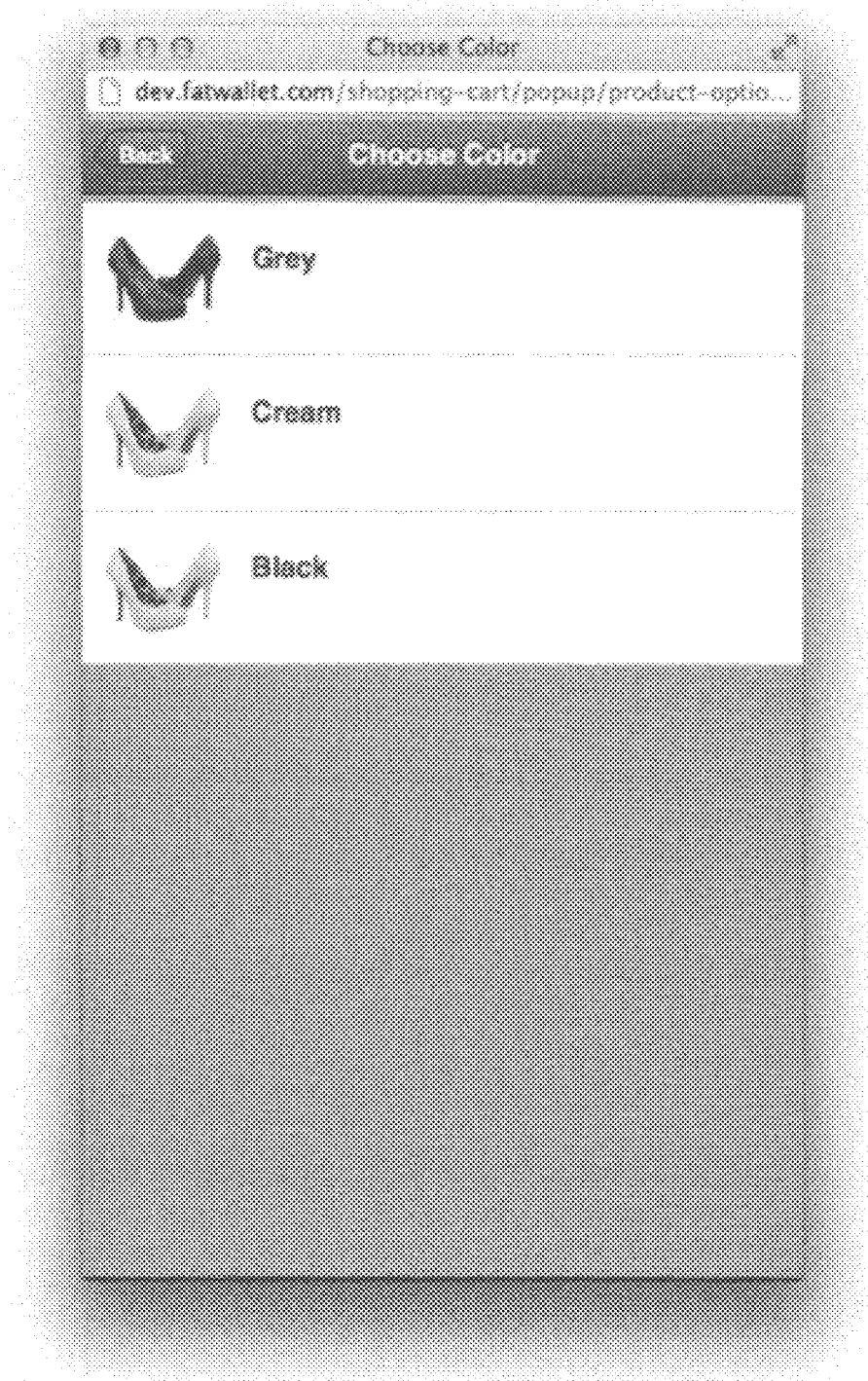
Figure 6E:
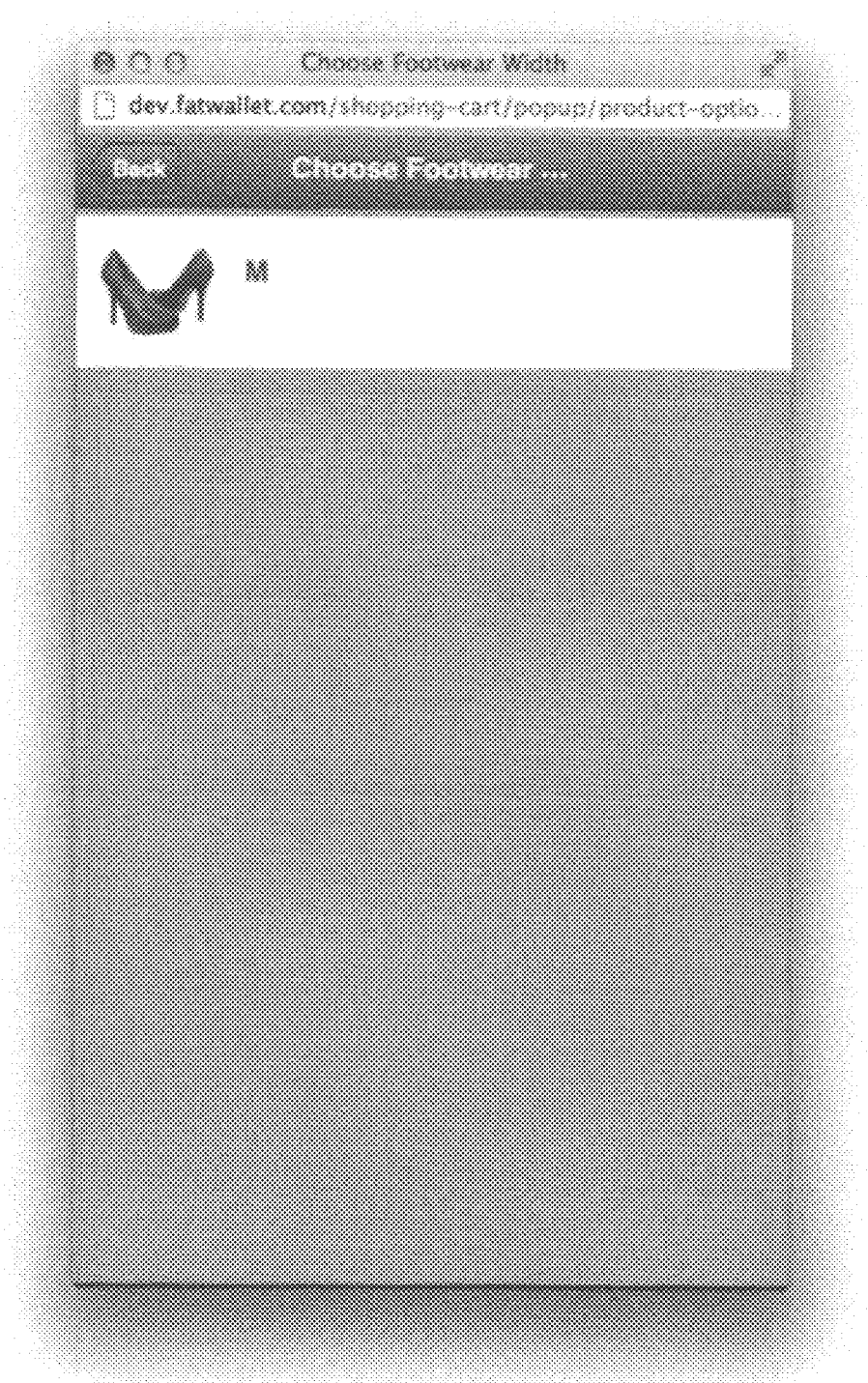
Figure 6F:
Figure 6G:
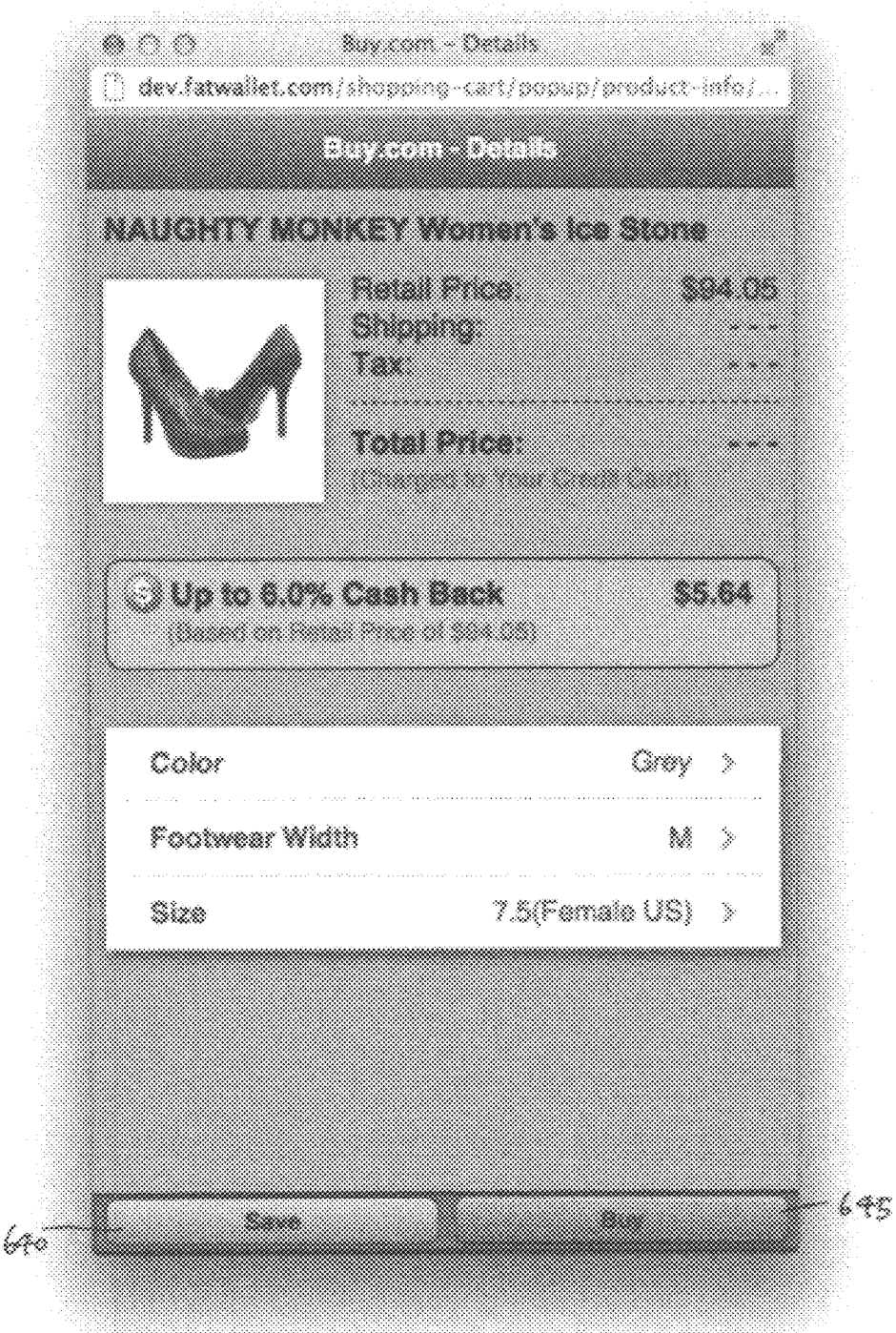

If the product has options, these options would be displayed in the user interface. In this case, there are three options: color 625, footwear width 630, and size 635. When the user selects the option for color 625, he or she is presented in the user interface with choices for colors for the women's dress shoe, as seen in FIG. 6d. When the user selects the option for footwear width 630, he or she is presented in the user interface with choices for shoe width, as seen in FIG. 6e. In this case, there is only one choice for shoe width. When the user selects the option for size 635, the user is presented in the user interface with choices for shoe size, as seen in FIG. 6f. As seen in FIG. 6g, once the user has completed the selection of the product options, he or she may then elect to either save the product into his or her shopping cart 640 for retrieval at a later time or to purchase the product 645.

Figure 6H:
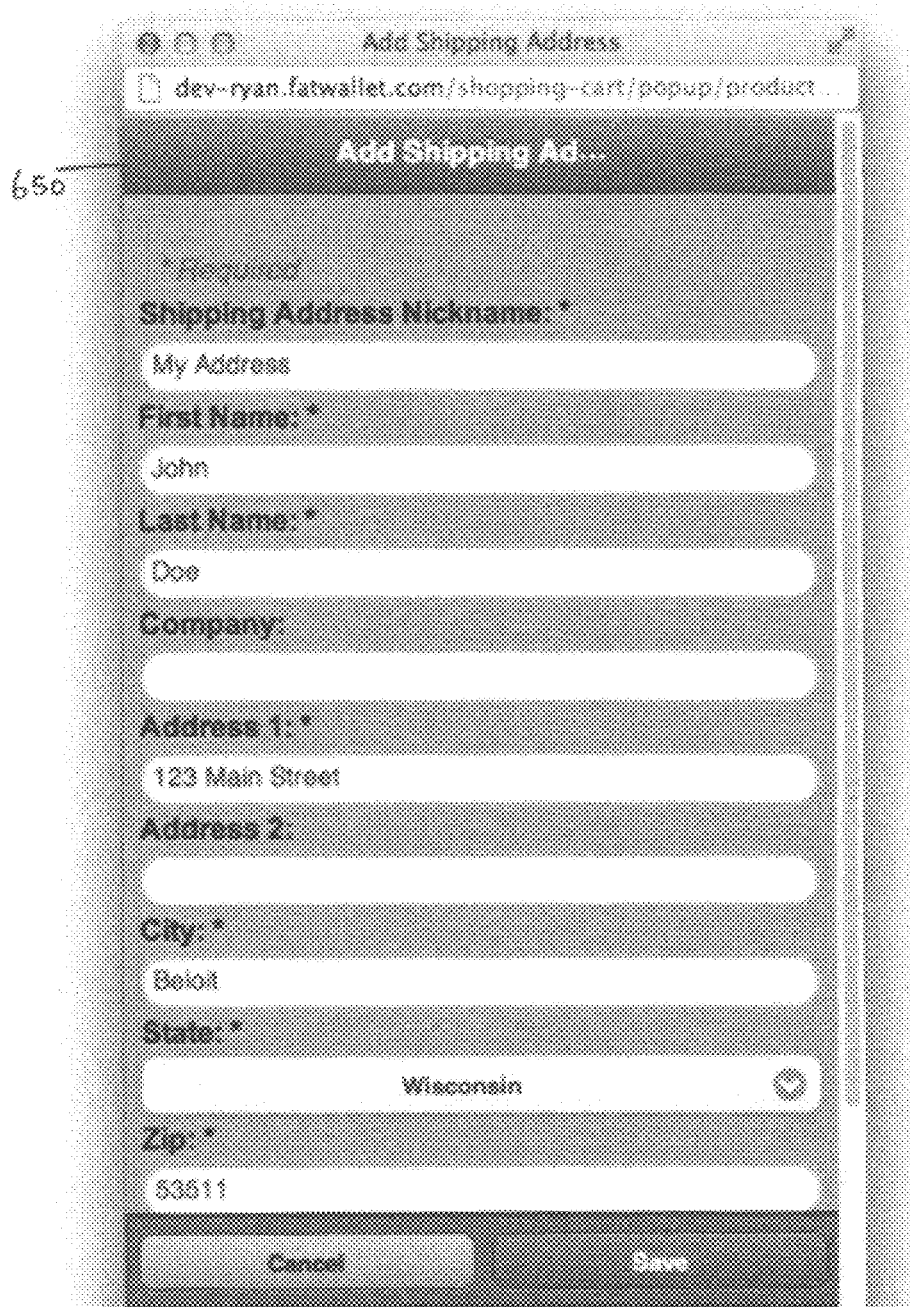
Figure 6I:
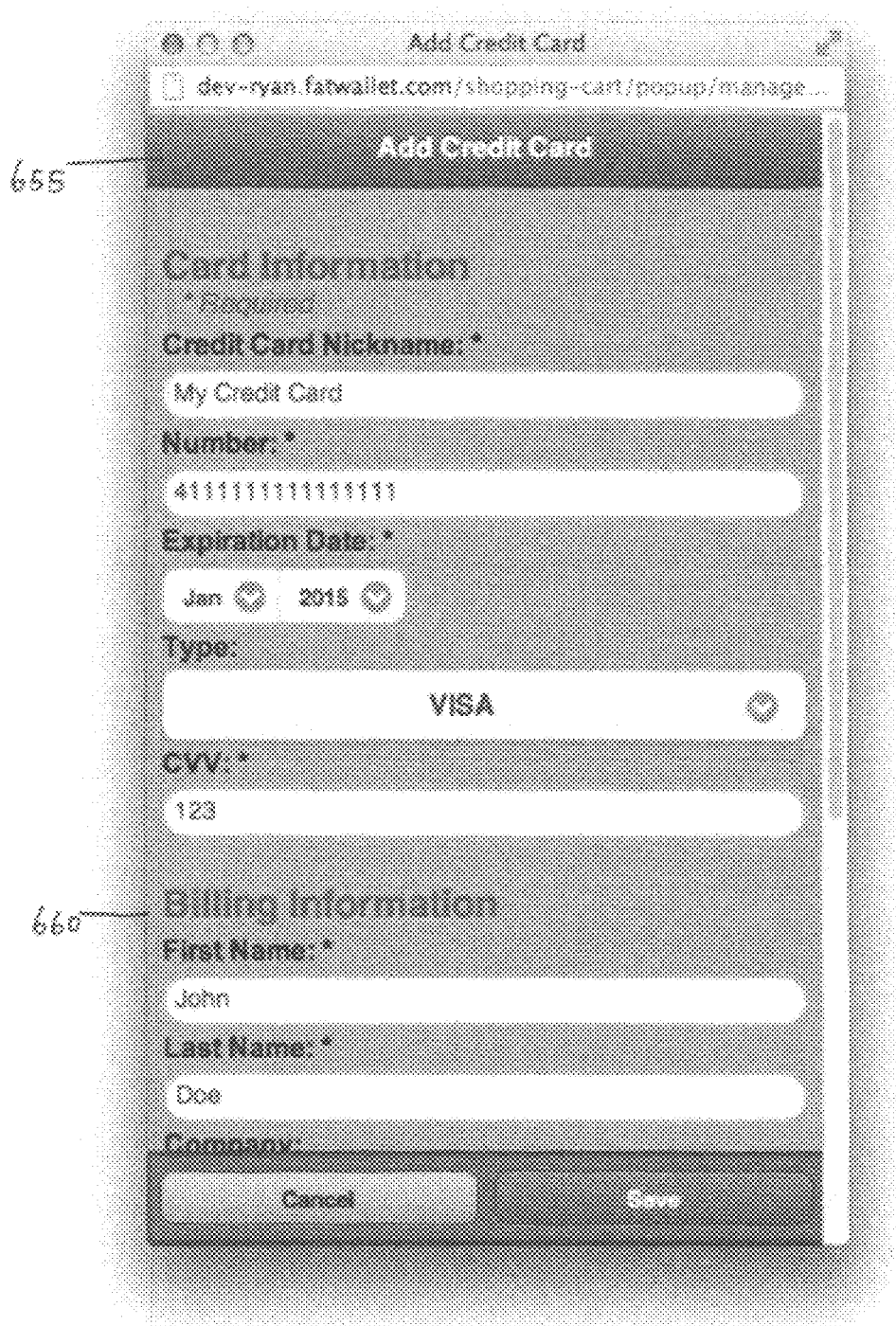
Figure 6J:
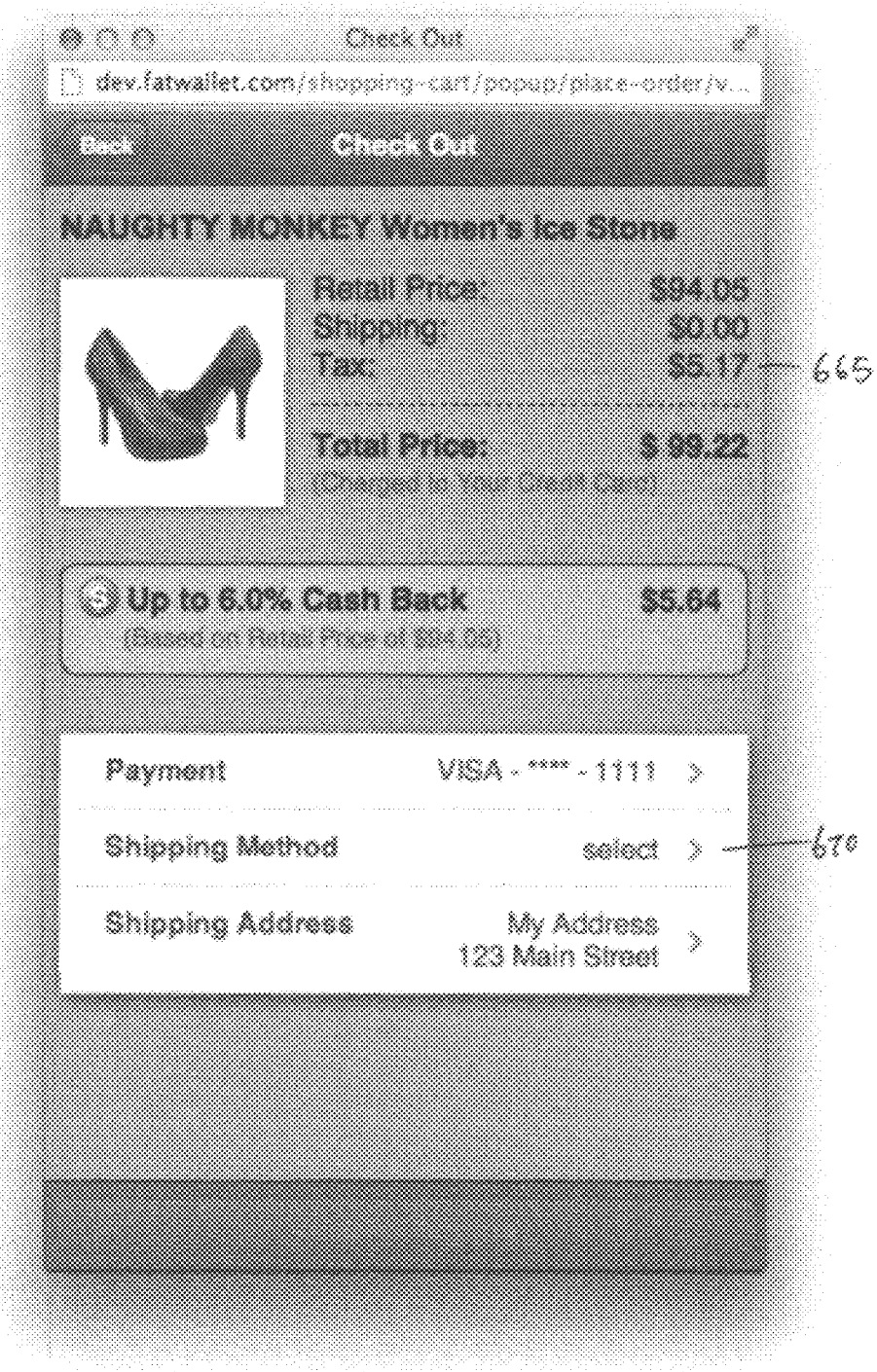
Figure 6K:
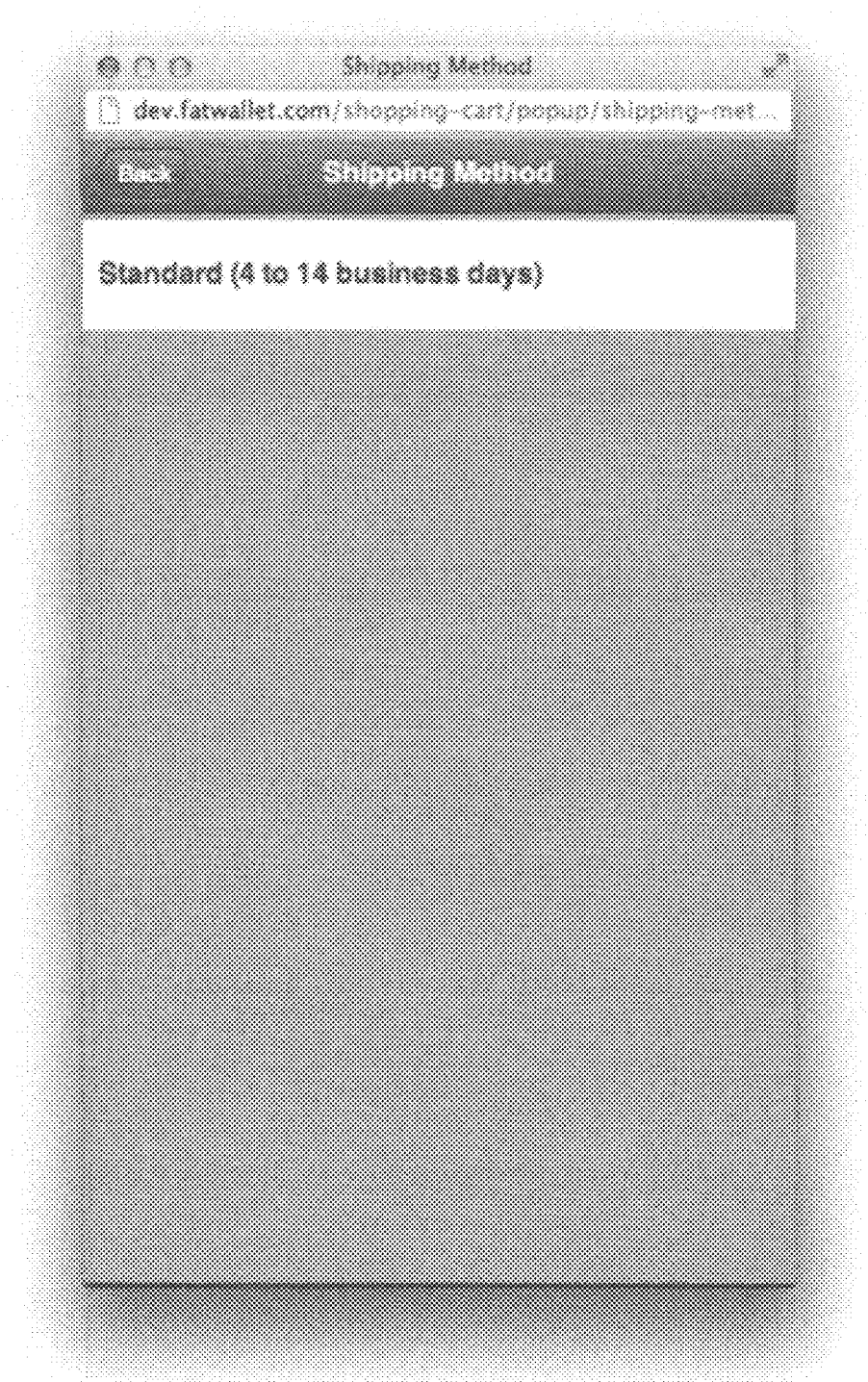

If the user is purchasing a product using the multi-merchant shopping cart for the first time, he or she would then need to input and save his or her shipping information 650, credit card information 655, and billing information 660, as seen in FIGS. 6h-6i. Once the user's information is saved, the multi-merchant shopping cart calculates the applicable tax 665 based on the user's address information, as seen in FIG. 6j. If the user has previously purchased one or more products using the multi-merchant shopping chart, he or she need not reenter his or her information and the applicable tax would automatically be calculated. The user then selects the option for the shipping method 670 and is presented in the user interface with choices for shipping method, as seen in FIG. 6k. In this case, there is only one choice for shipping method.

Figure 6L:
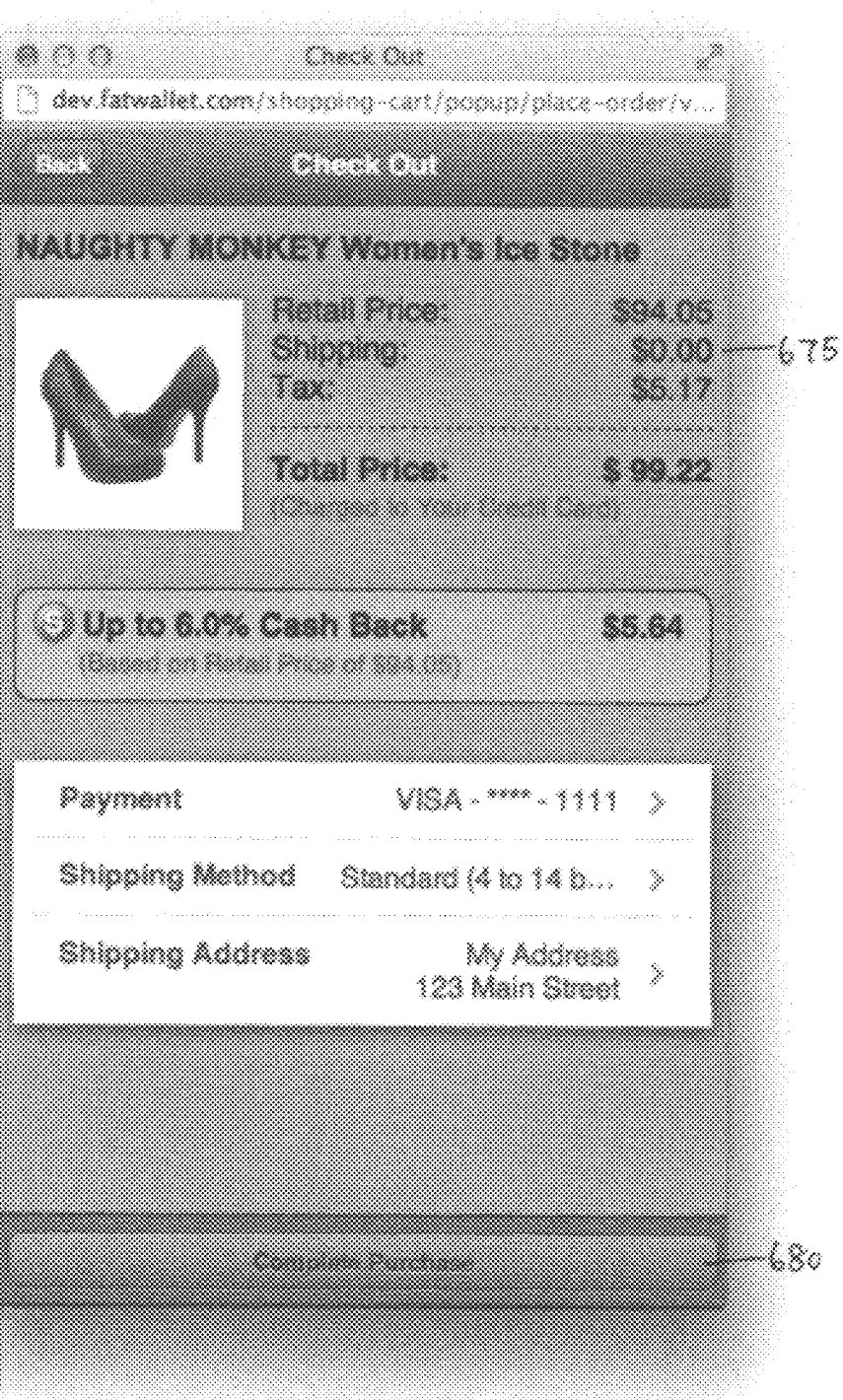
Figure 6M:
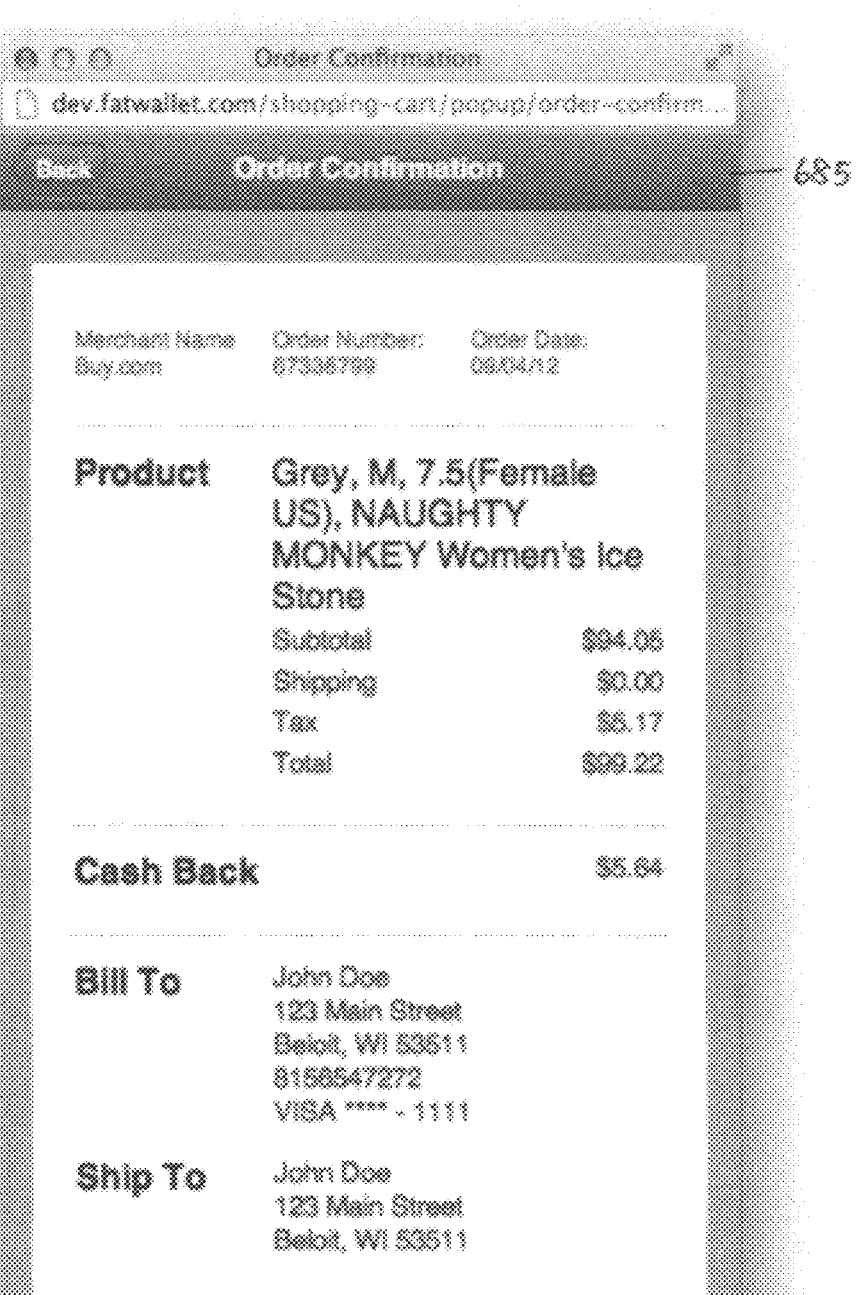

The multi-merchant shopping cart then calculates the shipping cost 675 based on the user's elected shipping method, as seen in FIG. 6l. In this case, the elected shipping method is free to the user. Once the user reviews his or her purchase order and elects to complete his or her purchase 680, the multi-merchant shopping cart sends the purchase request to the shopping cart server, as discussed more fully with regard to FIG. 5. The shopping cart server may send an immediate purchase confirmation 685, as seen in the user interface of FIG. 6m or may simply acknowledge receiving the order and communicate the purchase confirmation at a later time after processing the purchase transaction.

Figure 7A:
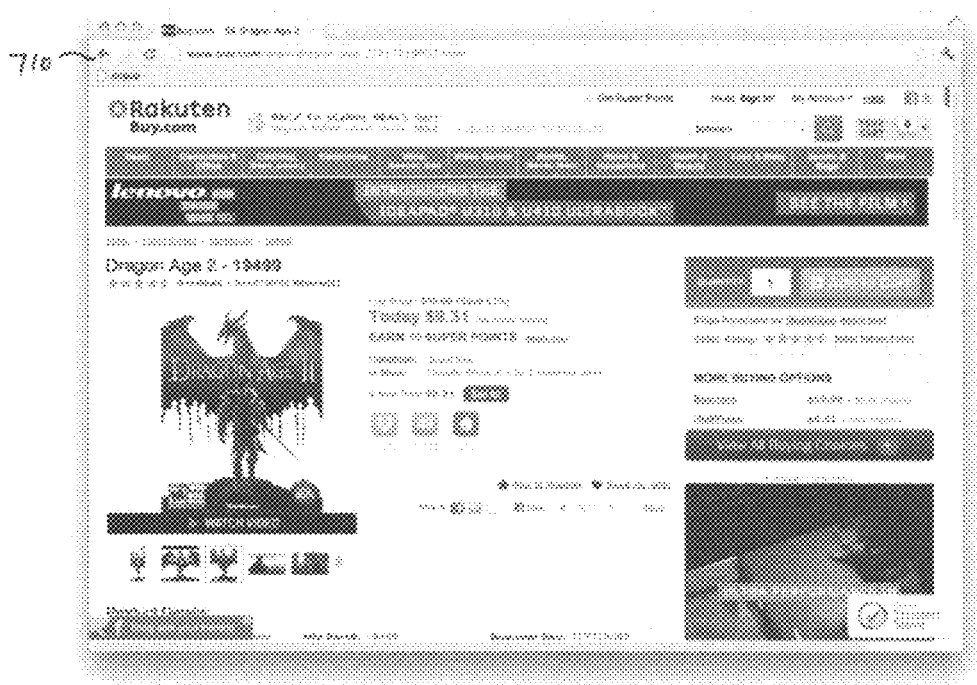
FIGS. 7a-7e are screenshots of an exemplary user interface in a multi-merchant electronic shopping cart system according to one embodiment of the invention.
Figure 7B:
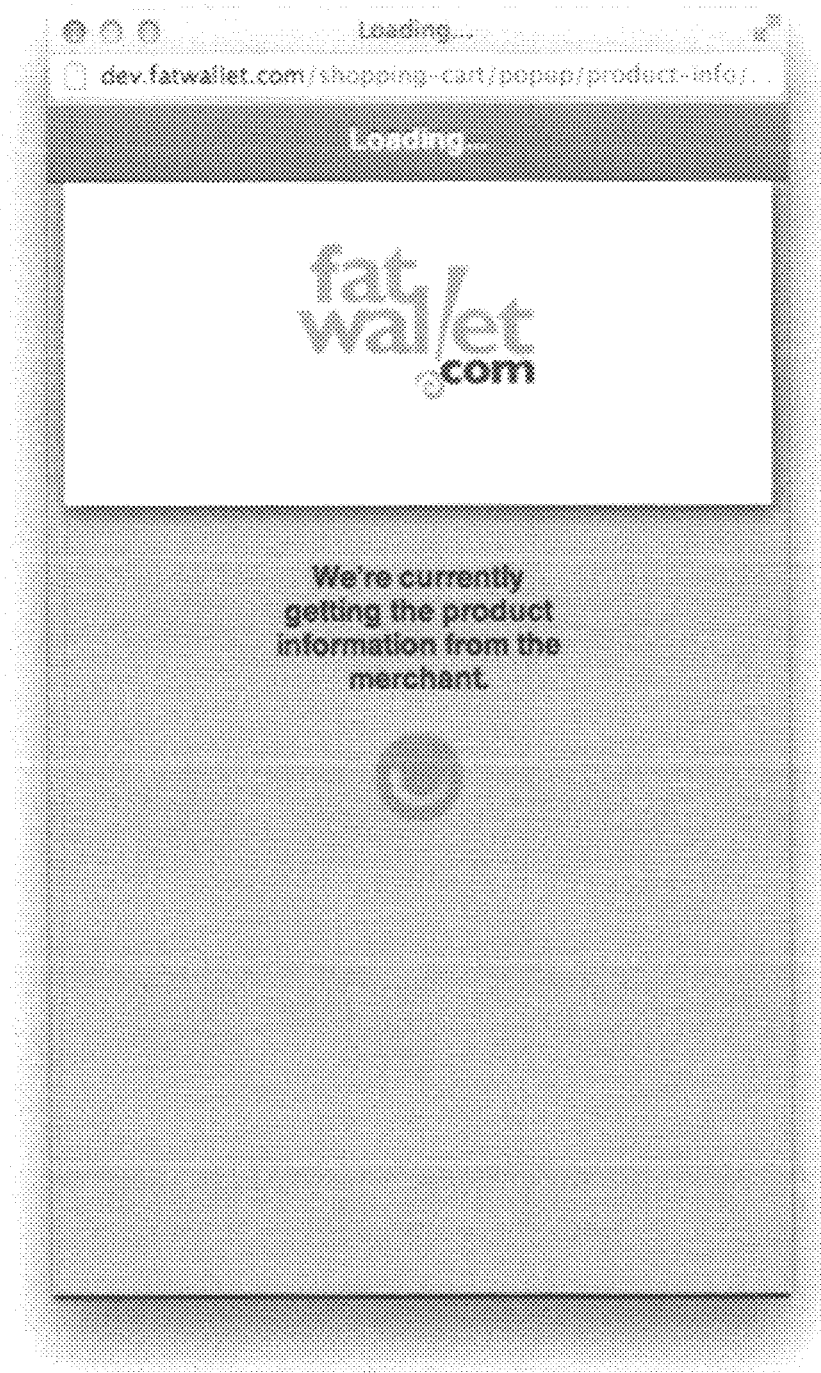
Figure 7C:
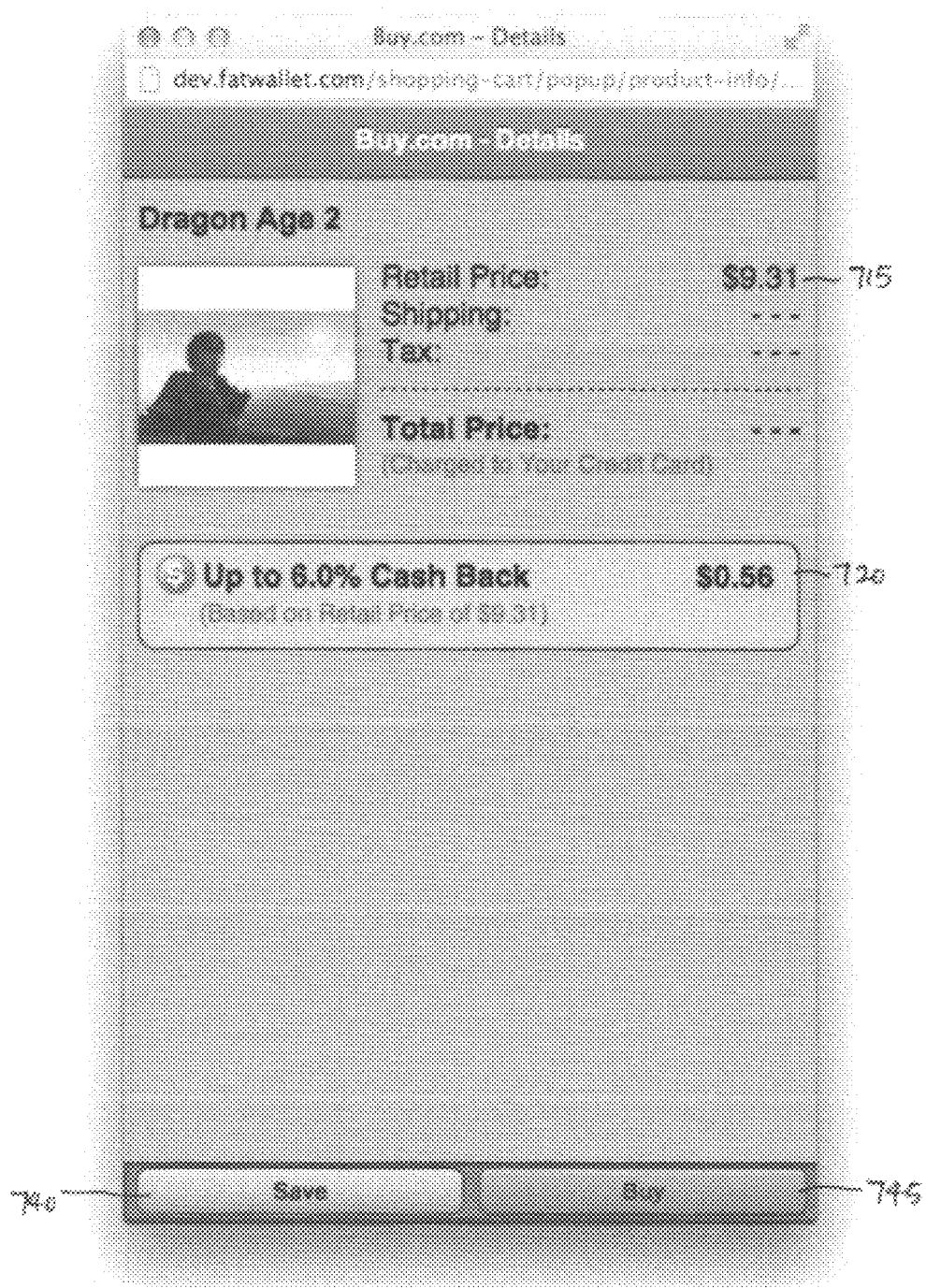

FIGS. 7a-7e illustrate screenshots of a user interface tracking a user who is saving a product to the multi-merchant shopping cart. Similar to FIG. 6a, a user views a webpage in FIG. 7a and selects the multi-merchant shopping cart 710. As seen in FIG. 7b, the shopping cart 710 retrieves information about the product from the merchant web site by sending the web site's URL to the shopping cart server and receiving back normalized product information, as discussed more fully with regard to FIG. 5. As seen in FIG. 7c, the user interface displays information regarding the price 715 of the product and cash back information 720. The user may elect to either save the product into his or her shopping cart 740 for retrieval at a later time or to purchase the product 745.

Figure 7D:
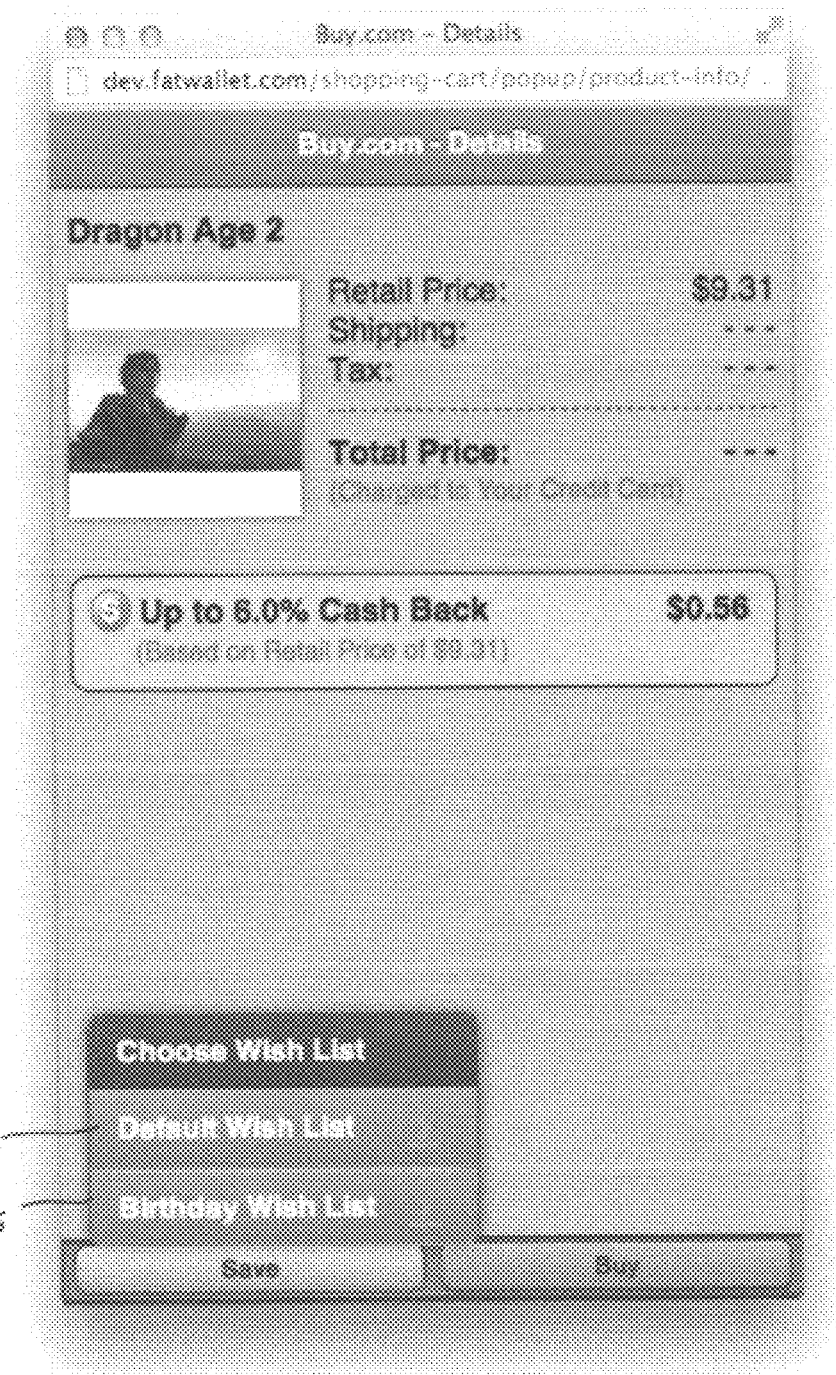
Figure 7E:
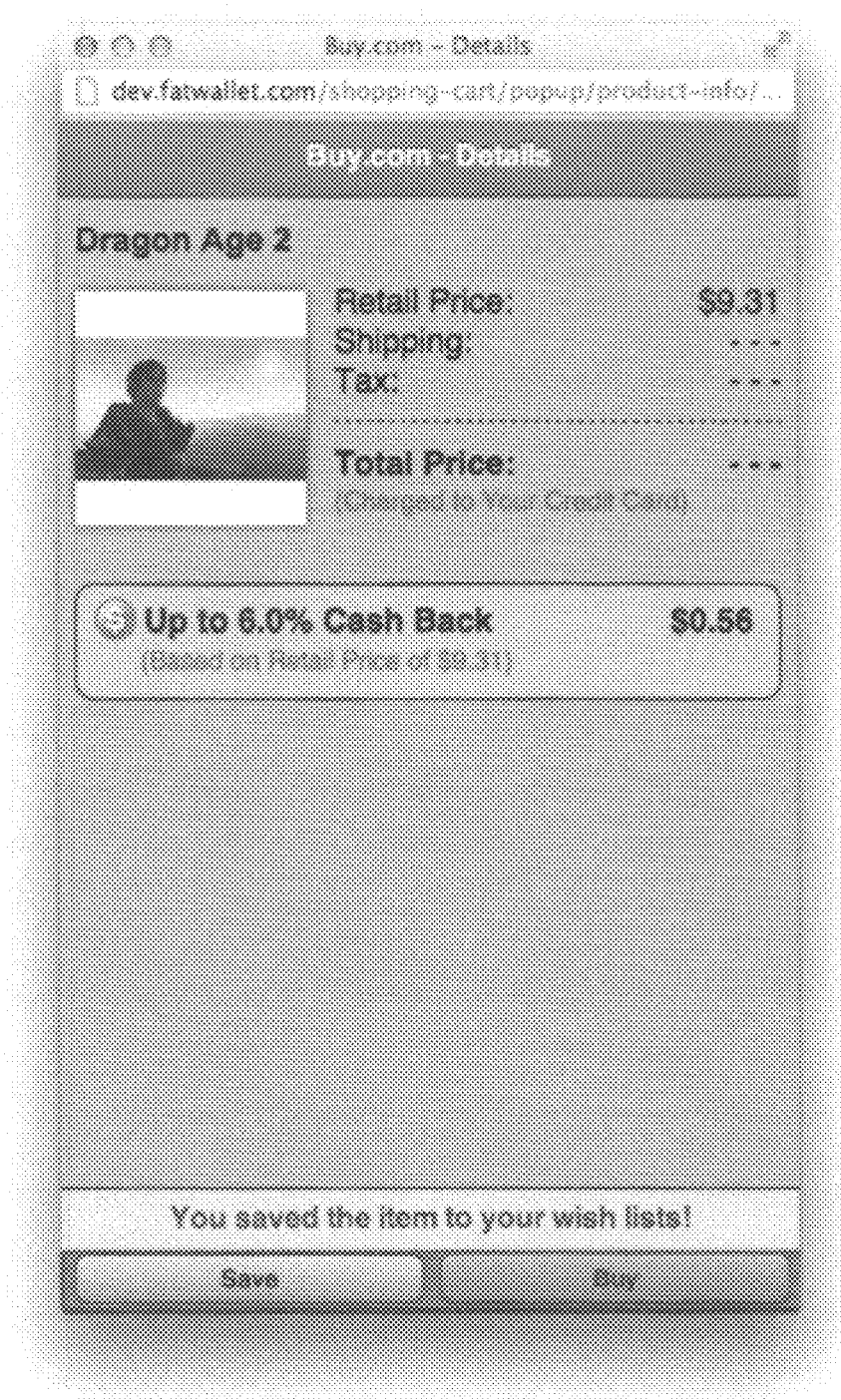

When the user elects to save the product into his or her shopping cart 740, he or she is presented with choices, as seen in FIG. 7d. In this example, a product is saved to a wish list, which may serve as a saved shopping cart. The user may save the product to a default wish list 790 or another system-defined or user-defined wish list 795 (e.g., a birthday wish list, a Christmas wish list, a registry etc.). A wish list may serve as a wedding registry or a baby registry that other users can view and from which other users can purchase products. In one embodiment, a user is able to create and name any number of wish lists. Once the user has elected a wish list to save the product, the multi-merchant shopping cart sends the save request to the shopping cart server, as discussed more fully with regard to FIG. 5. FIG. 7e illustrates the user interface of the multi-merchant shopping cart confirming to the user that his or her selected product has been saved into the shopping cart. The user may later purchase products saved to a wish list.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method performed by a computer system for providing a multi-merchant, electronic shopping cart for a shopping service, the method comprising:

provjding a shopping cart object within a web browser on a client computing device that provides access to an electronic shopping cart for the shopping service, wherein the shopping cart can be used at a plurality of unrelated merchant shopping sites and wherein the shopping cart object remains within the browser regardless of the website displayed in the browser;

in response to a user selecting a visual representation of the shopping cart object from within the browser, displaying a user interface for the electronic shopping cart in a new window, wherein a user is able to view the user interface for the electronic shopping cart without navigating the browser to a new webpage;

in response to the user selecting the visual representation while a webpage of an unrelated merchant shopping site that is supported by the electronic shopping cart is displayed in the browser, performing the following:

calling the URL of the webpage of the unrelated merchant shopping site displayed within the web browser;

automatically extracting information related to a product on the supported webpage of the unrelated merchant shopping site by scraping some or all of the product information from the webpage and automatically displaying the extracted information in the user interface for the electronic shopping cart prior to the product being added to the electronic shopping cart, wherein, if the product has one or more options, the information includes the options and the user is able to enter selections for the options via the user interface;

enabling the user to either commence a purchase transaction for the product via the electronic shopping cart or save the product in the electronic shopping cart for retrieval at a later time, wherein the user is able to save products from a plurality of unrelated merchant shopping sites to the electronic shopping cart; and in response to the user electing to purchase the product, conducting a purchase transaction on behalf of the user with the merchant associated with the supported webpage; and enabling the user to purchase at one time, from a plurality of unrelated merchant shopping sites, a plurality of products saved to the electronic shopping cart, wherein for each product to be purchased, a purchase transaction is conducted, on behalf of the user, with the merchant associated with the website from which the user added the product to the electronic shopping cart.

2. The method of claim 1, wherein the electronic shopping cart is associated with a shopping service that provides a reward based on purchases through the shopping service, and wherein the method further comprises:

crediting purchases made through the electronic shopping cart towards a reward calculation.

3. The method of claim 2, wherein the information displayed in the user interface includes a rewards calculation.

4. The method of claim 1, wherein the electronic shopping cart is associated with a shopping service that provides a cash back reward for purchases and wherein the method further comprises:

determining a cash back amount, if any, for each product displayed in the user interface for the electronic shopping cart;

displaying the cash back amount in the user interface for the electronic shopping cart;

in response to a user purchasing a product via the electronic shopping cart, crediting the user with the cash back amount.

5. The method of claim 1, further comprising:

for each product displayed in the user interface, determining if any coupon applies to the product or the corresponding merchant;

in response to identifying one or more coupons applicable to the product, displaying coupon information in the user interface; and in response to the user purchasing the product, applying any identified coupons to the purchase.

6. The method of claim 5, wherein determining if a coupon applies comprises:

identifying any potentially-applicable coupons; and for each potentially-applicable coupon, initiating an online purchase transaction with the applicable merchant to identify any price savings related to the coupon, wherein the purchase transaction is terminated before completion of a purchase.

7. The method of claim 5, wherein determining if a coupon applies comprises:

identifying any potentially-applicable coupons; and sending an API request to a merchant to determine whether any potentially-applicable coupons may be used in the purchase transaction.

8. The method of claim 1, wherein the automatically extracting information related to a product on the supported webpage and automatically displaying the extracted information step comprises extracting product information from the supported webpage, normalizing the extracted information, and displaying the normalized information in the user interface.

9. The method of claim 1, wherein the automatically extracting information related to a product on the supported webpage and automatically displaying the extracted information step comprises identifying an application programming interface associated with the website, sending a request for product information on the webpage to the application programming interface, receiving the requested information, and displaying the requested information in the user interface for the electronic shopping cart.

10. The method of claim 1, wherein the shopping cart object is a software program embedded within the browser.

11. The method of claim 1, wherein the shopping cart object is one of a bookmarklet, browser add-on, browser extension, browser widget, or toolbar.

12. The method of claim 1, wherein the shopping cart object provides access to a plurality of electronic shopping carts and a user is able to save products to any one of a plurality of electronic shopping carts.

13. The method of claim 12, wherein one of a plurality of electronic shopping carts represents a registry.

14. The method of claim 12, wherein a user is able to designate a privacy level for each of the electronic shopping carts.

15. The method of claim 1, wherein conducting a purchase transaction comprises:
retrieving a user-saved address and payment information;
providing said information to the merchant associated with the purchase transaction;
receiving a purchase confirmation from the merchant; and
communicating the purchase confirmation to the user.

16. A system for providing a multi-merchant electronic shopping cart for a shopping service, the system comprising:
a client computing device that enables a user to access an electronic shopping cart for the shopping service by selecting a visual representation of the shopping cart object within a web browser, wherein, in response to the user selecting a visual representation of the shopping cart while a webpage of an unrelated merchant shopping site that is supported by the electronic shopping cart is displayed in the web browser, the URL of the webpage of the unrelated merchant shopping site displayed within the web browser is called and information related to a product on the supported webpage of the unrelated merchant shopping site is automatically extracted by scraping some or all of the product information from the webpage and a user interface for the electronic shopping cart is automatically generated with the extracted information prior to the product being added to the electronic shopping cart, and wherein a user is able to purchase the product or save the product to the electronic shopping cart; and
a server for providing the information to the client computing device, for saving product information to the electronic shopping cart in response to the user electing to save the product, and for conducting a purchase transaction on behalf of the user with an applicable merchant in response to the user electing to purchase the product.

17. One or more non-transitory computer-readable media comprising code that, when executed by a computer system, enables the computer system to perform the following method for providing a multi-merchant electronic shopping cart for a shopping service, the method comprising:
providing a shopping cart object within a user's web browser on a client computing device that provides access to an electronic shopping cart for the shopping service, wherein the shopping cart can be used at a plurality of unrelated merchant shopping sites and wherein the shopping cart object remains within the browser regardless of the website displayed in the browser;
in response to the user selecting a visual representation of the shopping cart object from within the browser, displaying a user interface for the electronic shopping cart in a new window, wherein a user is able to view the user interface for the electronic shopping cart without navigating the browser to a new webpage;
in response to the user selecting the visual representation while a webpage of an unrelated merchant shopping site that is supported by the electronic shopping cart is displayed in the browser, performing the following:
calling the URL of the webpage of the unrelated merchant shopping site displayed within the web browser;
automatically extracting information related to a product on the supported webpage of the unrelated merchant shopping site by scraping some or all of the product information from the webpage and automatically displaying the extracted information in the user interface for the electronic shopping cart prior to the product being added to the electronic shopping cart, wherein, if the product has one or more options, the information includes the options and the user is able to enter selections for the options via the user interface;
enabling the user to either commence a purchase transaction for the product via the electronic shopping cart or save the product in the electronic shopping cart for retrieval at a later time, wherein the user is able to save products from a plurality of unrelated merchant shopping sites to the electronic shopping cart; and
in response to the user electing to purchase the product, conducting a purchase transaction on behalf of the user with the merchant associated with the supported webpage; and
enabling the user to purchase at one time, from a plurality of unrelated merchant shopping sites, a plurality of products saved to the electronic shopping cart, wherein for each product to be purchased, a purchase transaction is conducted, on behalf of the user, with the merchant associated with the website from which the user added the product to the electronic shopping cart.

18. The one or more non-transitory computer-readable media of claim 17, wherein the electronic shopping cart is associated with a shopping service that provides a reward based on purchases through the shopping service, and wherein the method further comprises:
crediting purchases made through the electronic shopping cart towards a reward calculation.

19. The one or more non-transitory computer-readable media of claim 18, wherein the information displayed in the user interface includes a rewards calculation.

20. The one or more non-transitory computer-readable media of claim 17, wherein the electronic shopping cart is associated with a shopping service that provides a cash back reward for purchases and wherein the method further comprises:
determining a cash back amount, if any, for each product displayed in the user interface for the electronic shopping cart;
displaying the cash back amount in the user interface for the electronic shopping cart;
in response to a user purchasing a product via the electronic shopping cart, crediting the user with the cash back amount.

21. The one or more non-transitory computer-readable media of claim 17, further comprising:
for each product displayed in the user interface, determining if any coupon applies to the product or the corresponding merchant;

in response to identifying one or more coupons applicable to the product, displaying coupon information in the user interface; and in response to the user purchasing the product, applying any identified coupons to the purchase.

22. The one or more non-transitory computer-readable media of claim 21, wherein determining if a coupon applies comprises:

identifying any potentially-applicable coupons; and for each potentially-applicable coupon, initiating an online purchase transaction with the applicable merchant to identify any price savings related to the coupon, wherein the purchase transaction is terminated before completion of a purchase.

23. The one or more non-transitory computer-readable media of claim 21, wherein determining if a coupon applies comprises:

identifying any potentially-applicable coupons; and sending an API request to a merchant to determine whether any potentially-applicable coupons may be used in the purchase transaction.

24. The one or more non-transitory computer-readable media of claim 17, wherein the automatically extracting information related to a product on the supported webpage and automatically displaying the extracted information step comprises extracting product information from the supported webpage, normalizing the extracted information, and displaying the normalized information in the user interface.

25. The one or more non-transitory computer-readable media of claim 17, wherein the automatically extracting information related to a product on the supported webpage and automatically displaying the extracted information step comprises identifying an application programming interface associated with the website, sending a request for product information on the webpage to the application programming interface, receiving the requested information, and displaying the requested information in the user interface for the electronic shopping cart.

26. The one or more non-transitory computer-readable media of claim 17, wherein the shopping cart object is a software program embedded within the browser.

27. The one or more non-transitory computer-readable media of claim 17, wherein the shopping cart object is one of a bookmarklet, browser add-on, browser extension, browser widget, or toolbar.

28. The one or more non-transitory computer-readable media of claim 17, wherein the shopping cart object provides access to a plurality of electronic shopping carts and a user is able to save products to any one of a plurality of electronic shopping carts.

29. The one or more non-transitory computer-readable media of claim 28, wherein one of a plurality of electronic shopping carts represents a registry.

30. The one or more non-transitory computer-readable media of claim 28, wherein a user is able to designate a privacy level for each of the electronic shopping carts.

31. The one or more non-transitory computer-readable media of claim 17, wherein conducting a purchase transaction comprises:

retrieving a user-saved address and payment information;

providing said information to the merchant associated with the purchase transaction;

receiving a purchase confirmation from the merchant; and communicating the purchase confirmation to the user.

\* \* \* \* \*